US011677473B2

(12) United States Patent
Morrison

(10) Patent No.: US 11,677,473 B2
(45) Date of Patent: Jun. 13, 2023

(54) HYBRID WIRE-FIBER DATA NETWORKS FOR ELECTROMAGNETIC AND/OR GROUND-NOISE ENVIRONMENTS, COMPONENTS THEREOF, AND SYSTEMS INCORPORATING SAME

(71) Applicant: Brian D. Morrison, Hopkinton, MA (US)

(72) Inventor: Brian D. Morrison, Hopkinton, MA (US)

(*) Notice: Subject to any disclaimer, the term of this patent is extended or adjusted under 35 U.S.C. 154(b) by 0 days.

(21) Appl. No.: 17/860,559

(22) Filed: Jul. 8, 2022

(65) Prior Publication Data

US 2023/0008941 A1    Jan. 12, 2023

Related U.S. Application Data

(60) Provisional application No. 63/220,396, filed on Jul. 9, 2021.

(51) Int. Cl.
*H04B 10/40*  (2013.01)
*H04L 12/40*  (2006.01)

(52) U.S. Cl.
CPC .... *H04B 10/40* (2013.01); *H04L 2012/40215* (2013.01); *H04L 2012/40273* (2013.01)

(58) Field of Classification Search
CPC .......... H04B 10/40; H04L 2012/40215; H04L 2012/40273

(Continued)

(56) References Cited

U.S. PATENT DOCUMENTS 9,571,199 B1    2/2017  Bannon
9,764,822 B2    9/2017  Morrison
(Continued)

FOREIGN PATENT DOCUMENTS

CN    102026050 A    4/2011
EP    3393061 A1    10/2018
WO    2018104929 A1    6/2018

OTHER PUBLICATIONS

Life After Airliners VI, EAA AirVenture 2003, Oshkosh, WI; pp. 1-40; Aug. 3, 2003.

(Continued)

*Primary Examiner* — Dalzid E Singh
(74) *Attorney, Agent, or Firm* — Downs Rachlin Martin PLLC

(57) ABSTRACT

Hybrid wire-fiber data networks that include wire-fiber transceivers protected against environmental interferences. In some embodiments, a hybrid-wire-fiber data network of this disclosure provides a fiber-optic link between portions of one or more wired networks. In some embodiments, a hybrid wire-fiber data network of this disclosure includes a fiber-optic link that relies only on message-priority arbitration performed on wired portions of one or more wired networks. In some embodiments, a wire-fiber transceiver of this disclosure includes electromagnetic environment (EME) protective circuitry for one or both of input power and input signals. In some embodiments, a wire-fiber transceiver of this disclosure is configured for use with a controlled area network media-access protocol (CAN) and/or a derivative of CAN. Various data communication and other methods are also disclosed in addition to hybrid wire-fiber data networks and components thereof.

30 Claims, 11 Drawing Sheets

(58) Field of Classification Search
USPC .......................................................... 398/135
See application file for complete search history.

(56) References Cited

U.S. PATENT DOCUMENTS

| | | | | |
|---|---|---|---|---|
| 10,949,377 | B1* | 3/2021 | Zanetti | .................. H04B 10/40 |
| 2011/0058813 | A1 | 3/2011 | Boyd | |
| 2014/0258742 | A1* | 9/2014 | Chien | ..................... H04L 12/10 |
| | | | | 713/300 |
| 2016/0028483 | A1* | 1/2016 | Louderback | ....... H04B 10/0795 |
| | | | | 398/5 |
| 2016/0050029 | A1* | 2/2016 | Huegerich | ........... G02B 6/4293 |
| | | | | 398/116 |
| 2016/0334591 | A1* | 11/2016 | Wood | ................... G02B 6/4206 |
| 2020/0183104 | A1* | 6/2020 | Truong | ................ G02B 6/4246 |

OTHER PUBLICATIONS

Life After Airliners VII, EAA AirVenture 2004, Oshkosh, WI; pp. 1-35; Jul. 30, 2004.
Dr. Bruce J. Holmes, Small Aircraft Transportation System—A Vision for 21st Century Transportation Alternatives, NASA Langley Research Center; pp. 1-5; 2002.
International Search Report and Written Opinion dated Jan. 9, 2023, in connection with PCT/US2022/036477, filed Jul. 8, 2022.

\* cited by examiner

HYBRID WIRE-FIBER DATA NETWORKS FOR ELECTROMAGNETIC AND/OR GROUND-NOISE ENVIRONMENTS, COMPONENTS THEREOF, AND SYSTEMS INCORPORATING SAME

RELATED APPLICATION DATA

This application claims the benefit of priority of U.S. Provisional Patent Application Ser. No. 63/220,396, filed Jul. 9, 2021, and titled "HYBRID WIRE-FIBER DATA NETWORKS FOR ELECTROMAGNETIC ENVIRONMENTS, COMPONENTS THEREOF, AND SYSTEMS INCORPORATING SAME", which is incorporated by reference herein in its entirety.

FIELD OF THE INVENTION

The present invention generally relates to the field of hybrid data networks. In particular, the present invention is directed to hybrid wire-fiber data networks for electromagnetic and/or ground-noise environments, components thereof, and systems incorporating same.

BACKGROUND

Although electric-powered aircraft are not new, there are relatively recent designs that are rapidly evolving and may not be suited for the rigors or regulatory requirements of carrying human passengers with reliability and safety capabilities found in larger transport aircraft. Most are battery powered or hybrid powered and involve the use of high-current, high-voltage motors of differing types. In one example, U.S. Pat. No. 9,764,822 relates specifically to a hydrogen fuel-cell powered electric multi-copter that does not include the electromagnetic-interference-mitigating features that tend to enhance safety and reliability for a Federal Aviation Administration (FAA)-certified passenger-carrying vehicle.

A large volume of personal travel today occurs by air. For destinations that require travel of more than 500 miles, it has historically been the fastest travel mode and, in terms of injuries per passenger mile, the safest. However, only about 200 hub-and-spoke airports exist within the U.S., placing much of the population more than 30 minutes away from an airport. Yet there are over 5,300 small control-towered regional airports, and over 19,000 small airfields with limited or no control towers throughout the U.S., placing more than 97% of the population within 15 to 30 minutes of an airfield. As many have noted before, this is a vastly under-utilized capability.

In the 21st century, the opportunity is available to apply advanced technologies of the evolving National Airspace System (NAS) to enable more-distributed, decentralized travel in the three-dimensional airspace, leaving behind many of the constraints of the existing hub-and-spoke airport system and the congestion of the 2-dimensional interstate and commuter highway systems. Yet because of the rapidly increasing utilization of the RF spectrum, great care must be taken to ensure that thousands, even tens of thousands, of advanced personal air mobility vehicles, sometimes called "Advanced Air Mobility Vehicles", can operate safely, securely, and without any chance of radio frequency (RF) (electromagnetic environment (EME), generally) interference or suffering damage and loss of control due to lightning and/or ground-differential effects.

Many large cities, such as Boston, Houston, Los Angeles, and other major metropolitan areas are virtually gridlocked by commuter traffic, with major arteries already at or above capacity, and with housing and existing businesses posing serious obstacles to widening or further construction. NASA, in its "Life After Airliners" series of presentations (see Life After Airliners VI, EAA AirVenture 2003, Oshkosh, Wis. Aug. 3, 2003, and "Life After Airliners VII," EAA AirVenture 2004, Oshkosh, Wis. Jul. 30 2004) and NASA's Dr. Bruce Holmes (see "Small Aircraft Transportation System—A Vision for 21st Century Transportation Alternatives," Dr. Bruce J. Holmes, NASA Langley Research Center. 2002) make the case for a future of aviation that is based on the hierarchical integration of Personal Air Vehicles (PAVs) operating in an on-demand, disaggregated, distributed, point-to-point and scalable manner, to provide short haul air mobility. Such a system would rely heavily on the 21st century integrated airspace, automation and technology rather than today's centralized, aggregated, hub-and-spoke system.

The first, or lowest, tier in this hierarchical vision includes small, PAVs or aircraft, allowing people to move efficiently and simply from point-to-any-point, without being restricted by ground transportation congestion or the availability of high-capability airports. Key requirements include reduced or eliminated noise impacts to communities, vehicle automation, operations in non-radar-equipped airspace and at non-towered facilities, green technologies for propulsion, increased safety and reliability, and en-route procedures and systems for integrated operation within the National Airspace System (NAS) or foreign equivalents. Ultimate goals cited by NASA include an automated self-operated aircraft, and a non-hydrocarbon-powered aircraft for intra-urban transportation. NASA predicts that, in time, up to 45% of all future miles traveled will be in Personal Air Vehicles.

SUMMARY OF THE DISCLOSURE

In one implementation, the present disclosure is directed to a transceiver for a hybrid wire-fiber data network having a wired portion and a fiber-optic portion, wherein the wired portion is designed and configured to implement a media-access protocol having a message-transmission time and that includes a node-arbitration and prioritization scheme. The transceiver includes a wired-portion interface for connecting the transceiver to the wired portion of the hybrid wire-fiber data network, the wired-portion interface designed and configured to receive electrical-signal inputs from the wired portion of the hybrid wire-fiber network and to output electrical-signal outputs from the transceiver to the wired portion of the hybrid wire-fiber data network; at least one electromagnetic environment (EME) filter selected from the group consisting of an electromagnetic interference (EMI) filter and a high-intensity radio frequency (HIRF) filter in electrical communication with the at least one wire connector so as to protect the transceiver from damage due to EMI or HIRF or both; at least one fiber-optic-portion interface for connecting the transceiver to the fiber-optic portion of the hybrid wire-fiber data network, the at least one fiber-optic-portion interface designed and configured to output optical-signal outputs from the transceiver to the fiber-optic portion of the hybrid wire-fiber data network and to receive optical-signal inputs from the fiber-optic portion of the hybrid wire-fiber data network; electrical-signal to optical-signal conversion circuitry operatively connected between the at least one EME filter and the fiber-optic-portion interface, the electrical-signal to optical-signal conversion circuitry designed and configured to convert the electrical-signal inputs to the optical-signal outputs; and optical-signal to electrical signal conversion circuitry operatively connected between the optic-fiber-portion interface and the wired-portion interface, the optical-signal conversion circuitry designed and configured to convert the optical-signal inputs to the electrical-signal outputs; wherein the transceiver is configured to have a maximum signal delay that is less than the message transmission time of the media-access protocol so as to comply with requirements of the node-arbitration and prioritization scheme without requiring message reformulation.

In another implementation, the present disclosure is directed to a hybrid wire-fiber data network. The network includes a first wired subnetwork implementing a media-access protocol that includes a node-arbitration scheme having a bitwise arbitration priority scheme, the first wired subnetwork including at least one first node; a second wired subnetwork implementing the media-access protocol, the second wired subnetwork including at least one second node; a fiber-optic link between the first and second wired subnetworks, the fiber-optic link having a first end and a second end; a first transceiver operatively connecting the first end of the fiber-optic link to the first wired subnetwork, the first transceiver being a transceiver according to the paragraph immediately above; and a second transceiver operatively connecting the second end of the fiber-optic link to the second wired subnetwork, the second transceiver being a transceiver according to the paragraph immediately above.

In yet another implementation, the present disclosure is directed to a vehicle. The vehicle includes a propulsion system; a control system operatively configured to provide control commands to the propulsion system; and a hybrid wire-fiber data network according to the paragraph immediately above operatively connected between the control system and the propulsion system so as to pass the control commands from the control system to the propulsion.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
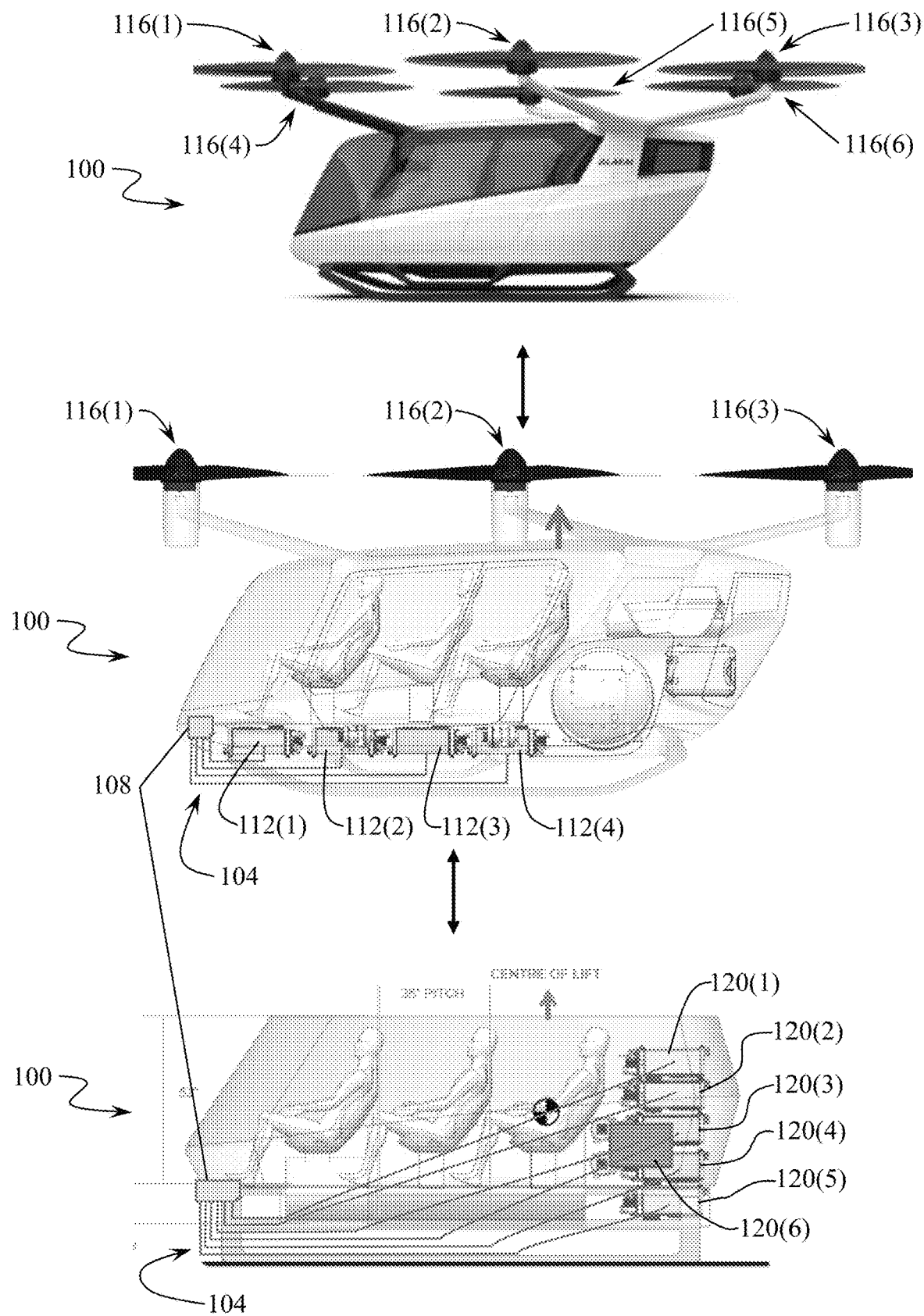
FIG. 1 is a set of linked diagrams, namely, an exterior side view (top), an enlarged partially see-through side view (middle), and a partially see-through cutaway side view (bottom) depicting an example air vehicle that includes hybrid wire-fiber data networks of the present disclosure.

In some aspects, the present disclosure is directed to hybrid wire-fiber data networks. In some embodiments, a hybrid wire-fiber data network of the present disclosure includes wired portions and at least one fiber-optic link between at least two of the wired portions, with specialized transceivers at differing ends of the fiber-optic link for converting electrical signals from each of the two wired portions to optical signals for the fiber-optic link and for converting the optical signals on the fiber-optic link to electrical signals for the wired portions of the hybrid wire-fiber data network, while maintaining the necessary arbitration between near- and far-end devices to assure reliable network behavior. In some embodiments, each of a pair of the ends of the fiber-optic link is operatively connected to a corresponding one of the two wired portions by a special transceiver, an example of which is described in detail below and illustrated in the accompanying figures.

In some embodiments, the wired portions of the hybrid wire-fiber data network utilizes a media-access protocol having an arbitration and priority scheme that arbitrates priorities for nodes on the two wired portions of the hybrid wire-fiber data network. In a particular example, and as discussed below in detail, an example of such a media access protocol is the controller area network (CAN) protocol, which uses a bitwise arbitration scheme. However, as those skilled in the art will readily appreciate after reading this entire disclosure, the CAN protocol is but one example of many protocols that a hybrid wire-fiber data network can be configured to utilize. In some embodiments, such as embodiments for the CAN protocol, each transceiver may include an inverter for inverting signals on the wired portions of the hybrid wire-fiber data network to minimize the time that the light-emitting element that generates the optical signals are in an emitting state.

Each transceiver includes a wired-portion interface for receiving electrical signals from one of the wired portions of the hybrid wire-fiber data network, and in some embodiments, each transceiver further includes one or more electromagnetic environment (EME) filters, such as an electromagnetic interference (EMI) filter, a high-intensity radio frequency (HIRF) filter, and a lightning suppression filter. As discussed below, the EMI filter(s) allows a hybrid wire-fiber data network of the present disclosure to be highly robust and, therefore, suitable for harsh EME environments and applications where signal integrity is paramount.

Each transceiver may include a power supply or power converter (hereinafter, "power supply/converter") having a power input for connecting the power supply/converter to an external power source. In some embodiments, when a power supply/converter is provided, the power input may include one or more EME filters, such as an EMI filter, an HIRF filter, and a lightning suppression filter. Similar to EME filter(s) for the wired-portion interface and as discussed below, the EMI filter(s) on the power input of a power supply/converter adds further robustness to a hybrid wire-fiber data network of the present disclosure. In some embodiments, EMI shielding can be provided to various components of the circuitry for converting the electrical and optical signals.

With such protections, hybrid wire-fiber data networks of the present disclosure can have unique capabilities, redundancy, safety, and other features that increase the reliability, reduce the chances of interference that may result in uncommanded events or accidents, and thus enhance the safety for humans, cargo, and/or other physicality that may be at issue.

In some aspects, the present disclosure is directed to the specialized transceivers themselves. In some aspects, the present disclosure is directed to applications of specialized transceivers of the present disclosure and applications of hybrid wire-fiber data networks of the present disclosure. Such applications include, but are not limited to, applications that involve moderate to severe EME exposures, including, but not limited to, a wide variety of air vehicles, including manned and unmanned electric vertical takeoff and landing air vehicles (eVTOLs) and electric conventional takeoff and landing vehicles (eCTOLs), among many others. In air-vehicle applications, implementation of transceivers and hybrid wire-fiber data networks of the present disclosure can reduce weight, achieve safety, increase resistance to electromagnetic interference, provide immunity to ground-potential differentials, eliminate lightning susceptibility and enhance flight-worthiness, and reduce or eliminate shield maintenance issues during the life of the vehicle, among other things.

For example, aspects of the presented disclosure are applicable to core fly-by-light network implementations for electric aircraft vehicles as one part of increasing safety and reliability for on-demand, widely distributed point-to-any point 21st century air mobility vehicles. In some embodiments, a hybrid wire-fiber data network of this disclosure can offer all of the performance advantages normally attributed to fiber optics (EMI, HIRF, and lightning immunity) while achieving a very low weight and low implementation cost. Incorporation of a hybrid wire-fiber data network as described herein can also result in control systems that are affordable enough for general aviation, while also being capable, modular, and expandable enough for regional and civil transports, helicopters, and military aircraft, among other aircraft applications.

Transceivers and/or hybrid wire-fiber data networks of the present disclosure can alternatively readily be applied to non-aircraft applications, for example, in: surface and submarine ship control and fire control systems; industrial and petrochemical plant controls; intrinsically-safe controls; truck, train, and marine transportation vehicles; and a wide range of trusted and safety-critical applications. Transceivers and/or hybrid wire-fiber data networks of the present disclosure can also be applied to automotive, rail, aerospace, marine, and any application where high-voltage and/or high-current electric motors must be controlled and commanded by a digital command or network. This broad application base leads to economies of scale that have historically not been available to aircraft systems manufacturers and integrators.

To provide an overall understanding, certain illustrative embodiments will now be described; however, it will be understood by one of skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods.

General

As mentioned above, various aspects of the present disclosure apply in a variety of applications, including to advanced air vehicles and other domains that employ high voltage and/or high current AC or DC brushed or brushless electric motors. Both the motors and the inverters (sometimes referred to as motor controllers) that govern their performance generate significant electric and/or magnetic fields as well as cause significant ground-potential differences between communicating systems, which can result in significant electromagnetic interference or EMI. Because of the nature of these advanced air vehicles, the susceptibility of advanced air vehicles to lightning strikes and HIRFs, and the enhanced need for safe operation of advanced air vehicles, the detailed examples presented herein are directed to such vehicles. However, those skilled in the art will readily appreciate that these examples are nonlimiting and presented for mere illustration of various aspects of this disclosure.

Many aircraft systems employ a digital control network to connect flight control computers digitally to one or more power sources, and ultimately to motor controllers, depending upon the architecture employed. One modern and common network protocol used to connect these devices digitally is called the Controller Area Network, or "CAN" as noted above. The CAN protocol is discussed in detail below. However, similar to the above indication of the heavy reliance of the present disclosure on examples directed to advanced air vehicles, while the CAN protocol is referenced herein most often, as also noted above, the present disclosure is not limited only to networks that utilize a CAN protocol. Rather, and as those skilled in the art will understand, aspects and features disclosed herein can be applied to another network protocol, such as another bitwise arbitration protocol (the CAN protocol is considered a bitwise arbitration protocol) or a contention protocol, among others.

A primary requirement for any aircraft data bus protocol is the support of real-time, critical control messages. The data bus must have a media access protocol that provides for guaranteed message delivery. The data bus must support error detection and fault tolerant mechanisms that ensure the reliable delivery of application messages and the reliable detection of corrupted messages. Desirable features include the ability to accommodate bidirectional communication via each channel to minimize interconnect complexity and the use of a common, open standard that is capable of being adopted by multiple suppliers and airframers, thereby further reducing costs.

The channel used to transport data among communicating devices must provide a reliable, safe mechanism that is not subject to significant error rates. Shielded twisted-pair wiring, which has been widely used in aircraft, requires complex shielding, bonding, maintenance and transmission line termination techniques, and yet remains susceptible to external threats from electromagnetic effects (i.e., EME, including EMI, HIRF, and lightning). Fiber-optic cable, in contrast, virtually eliminates EME, transmission line, and impedance matching problems associated with shielded twisted-pair wiring.

Similarly, optical signals do not radiate energy that could interfere with other electronics, thus eliminating emission and crosstalk problems. Optical signals are also immune to coupled RF energy, so a fiber-optic cable can be run among bundles of wire and RF conductors without fear of signal distortion or data errors caused by crosstalk from adjacent electrical signals for RF fields. Fiber-based signals are immune to being shorted to aircraft power or ground and do not require a quiet or even common ground reference between communicating equipment, since all data signaling is accomplished over a non-conductive optical path. Moreover, since shielding of the communication path is not required, a substantial savings in complexity, cost and weight can be realized. Furthermore, over the life of the vehicle there is no need for costly and time-consuming maintenance inspections of both ends of a shielded conductor or cable, which can degrade or corrode over time.

The characteristics that define and distinguish a data bus protocol include transmission media, physical interface hardware, data bit encoding, message latency, media access, message format, message protocol (end-to-end reliability, duplicate message detection), addressing modes and message services, error detection, fault tolerance, data rate, and framing overhead. Several of these data-bus characteristics are particularly important when considering the suitability of a protocol for aircraft or other transportation-vehicle usage. These characteristics include message latency, media access, error detection, and fault tolerance. Typically, a set of general requirements are developed that form the minimum criteria for the acceptance of a data bus architecture for use in a real-time, critical control system for aircraft applications.

A bidirectional bus or network architecture has multiple transmitter/receiver pairs connected via a time or frequency multiplexed data channel. An advantage of bidirectional bus architectures is the simplicity gained in interconnecting multiple Line Replaceable Units (LRUs) and allowing all LRUs to have a common communications path. Another advantage lies in the ability to provide bi-directional data flow, diagnostics, and other services across the network that, comparatively, are more cumbersome and require more complex interconnection when implemented across unidirectional channels.

Message latency is the time required for the protocol to transport data across the data bus. The media-access protocols described in the following paragraphs play a large part in determining the message latency. Other factors involve system issues that may include address or identifier assignment for bitwise arbitration or contention resolution techniques, and protocol processor performance.

Within a time multiplexed bidirectional bus architecture, some method must exist to regulate each transmitter's access to the data channel. Controlled access to the data channel may be done either via a single central bus arbiter or in a distributed fashion wherein each LRU's transmitter has hardware/software to arbitrate the usage of the data channel. Techniques are required in either method to avoid introducing any single points of failure.

There are five basic media-access protocols suitable for controlling access to bidirectional buses. These protocols may be implemented in hardware, software, or some combination of hardware and software. These protocols are:

Contention Protocol;
Time Slot Allocation Protocol;
Command/Response Protocol;
Token Passing Protocol; and
Bitwise Arbitration Protocol.

Contention protocol: Contention-based protocols expect data collisions as a normal occurrence. The data is then retransmitted after hardware or software detects the collision. This protocol offers the lowest minimum message latencies under light network loads but can collapse under heavy loads due to an excessive number of collisions. The latency for any given message can only be calculated using probabilistic methods, as there is no way to guarantee the maximum message latency. An example of a contention-based protocol is the IEEE 802.3 standard that is commonly known as Ethernet.

Time-slot allocation protocol: Protocols based on time-slot allocation assign a portion of the network bandwidth to each user. All users are allocated a unique time slot during which they may transmit a data packet. This protocol suffers from a larger minimum message latency under light network loads but will not collapse under heavy loads and offers the advantages of guaranteeing a maximum message latency and a specific data throughput. Examples of time-slot allocation protocols include SAE AS-5370 and ARINC 629.

Command/response protocol: The command/response protocol requires the use of a central arbiter to allocate bus bandwidth to individual users. When compared to contention-based protocols, this protocol suffers from a larger minimum message latency under light network loads but, like the time slot allocation protocol, offers the advantage of guaranteeing a maximum message latency and a minimum data throughput. While the arbiter simplifies the design of the Bus Interface Unit (BIU) or transceiver, it has the undesirable effect of adding a potential central point of failure to the system. An example of a command/response protocol is the Avionics Standard Communications Bus (ASCB).

Token passing protocol: Token passing protocols are conceptually similar to the time slot allocation protocol. Access to the data channel is controlled by passing a "token" as opposed to time-based allocation. The message latency and data throughput characteristics of the two protocols are similar. An example of a token passing protocol is the IEEE 802.5 standard that is commonly known as "Token Ring".

Bitwise-arbitration protocol: Bitwise-arbitration protocols are similar to contention-based protocols with the exception that message arbitration is resolved via non-destructive bitwise arbitration. Any node may transmit if the bus is idle, and arbitration amongst nodes that transmit simultaneously is resolved via a unique identifier field where the node with the higher priority always wins. When compared to contention-based protocols, this protocol also offers low minimum message latencies under light network loads, but like the time-slot allocation protocol, it also offers the advantage of guaranteeing a maximum message latency and a specific data throughput. The identifiers are assigned by the system designer and serve to prioritize access to the data bus media. Because bitwise arbitration is sensitive to the overall propagation delay of the network, it is not suited for data buses with large propagation delays such as ring topologies. An example of a bitwise arbitration protocol is CAN, which has been developed for the automotive industry and that is used in an example instantiation of the present disclosure that is discussed in detail below.

Error detection: The ability of a data bus protocol to detect and recover from errors in a particular message is critical. These errors may include single bit data errors, multi-bit data errors, incorrect message length errors, and message format errors. Errors within a message may be detected via the use of synchronization fields, bit encoding techniques (e.g., Manchester II, Non-Return to Zero, etc.), data parity bits, Cyclic Redundancy Checks (CRC), message length fields, predefined message formats, and other techniques.

Fault tolerance: A fault tolerant system is a system that can continue to perform its specified tasks in the presence of hardware failures and/or software errors. Fault tolerance is the attribute that enables a system to achieve fault-tolerant operation. Various techniques for fault tolerance have been developed specifically for data buses. These techniques include the ability to operate when bus wires are either open circuited or short circuited (either to ground or battery voltage), or the ability to operate in the presence of an optical break or distortion. Fault tolerance may be improved at the system level by adding redundant data links to the data bus, such as dual, triple, or quad redundant communications paths.

General data bus requirements: The primary requirement for a vehicle data bus is to reliably deliver real-time, critical control messages with bounded latency. The data bus should also provide support for non-critical messaging including messages that have widely varying data throughput and update rate requirements.

Methods and systems described herein are not limited to a particular aircraft or other vehicle hardware configuration and may find applicability in many aircraft, other transportation systems, and other operating environments. Applications exist within the auto industry, the trucking industry (which is beginning to adopt fuel-cells and high-horsepower electric motors on a wider scale), the marine industry, the railroad industry, and any other applications where CAN or similar networks are employed to control batteries, fuel cells, and/or electric motors, and/or applications subjected to EMEs that can affect operation of the system in which a hybrid wire-fiber network of the present disclosure is deployed.

Algorithms described herein can be implemented in hardware or software or a combination of hardware and software. The methods and systems can be implemented in one or more computer programs, where a computer program can be understood to include one or more processor-executable instructions. The computer program(s) can execute on one or more programmable processors and can be stored on one or more storage medium readable by the processor(s) (including hardware-type volatile and non-volatile memory and/or storage elements but excluding transitory signals), one or more input devices, and/or one or more output devices. The processor thus can access one or more input devices to obtain input data, and can access one or more output devices to communicate output data. The input and/or output devices can, for example, include any one or more of the following: a mission-control tablet computer, mission planning software program, throttle pedal, throttle arm, sidearm controller, yoke or control wheel, or other motion-indicating device capable of being accessed by a processor as provided herein, wherein such aforementioned examples are not exhaustive, and are for illustration and not limitation.

Computer program(s) of the present disclosure may be implemented using one or more high level procedural or object-oriented programming languages to communicate with a computer system. However, the computer program(s) can be implemented in assembly or machine language, if desired. The computer language used can be compiled or interpreted.

As provided herein, the processor(s) can, in some embodiments, be embedded in three identical devices that can be operated independently in a networked or communicating environment, where the network can include, for example, a Local Area Network (LAN) such as Ethernet, or serial networks such as RS-232, RS-422, SAE AS-5370, or CAN, among others. The network(s) can be wired, wireless RF, or broadband, or a combination thereof, and can use one or more communications protocols to facilitate communications between the different processors. The processors can be configured for distributed processing and can utilize, in some embodiments, a client-server model as needed. Accordingly, the methods and systems can utilize multiple processors and/or processor devices to perform the necessary algorithms and determine the appropriate vehicle commands, and if implemented in three units, the three units can vote among themselves to arrive at a 2-out-of-3 consensus for the actions to be taken. As would be appreciated by one skilled in the art, the voting can also be carried out using another number of units (e.g., one two, three, four, five, six, etc.). For example, the voting can use other system-state information to break any ties that may occur when an even number of units disagree, thus having the system arrive at a consensus that provides an acceptable level of safety for operations.

The device(s) or computer systems that integrate with the processor(s) for displaying "highway in the sky" presentations can include, for example, a personal computer with display, a workstation (e.g., Sun, HP), a personal digital assistant (PDA) or tablet such as an iPad, or another device capable of communicating with a processor(s) that can operate as provided herein. Accordingly, the devices provided herein are not exhaustive and are provided for illustration and not limitation.

References to "a processor" or "the processor" can be understood to include one or more processors that can communicate in a stand-alone and/or a distributed environment(s), and thus can be configured to communicate via wired or wireless communications with other processors, where such one or more processors can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. References to a network, unless provided otherwise, can include one or more networks, intranets, and/or the Internet.

Reference to Plastic Optical Fiber (POF) with separate transmit and receive optical fibers can also include single, unidirectional or bidirectional communications on other types of fiber networks, wherein transmission and reception of messages can occur on the single bidirectional channel or on the pairs of unidirectional channels. Multiplexing of fiber energy can be accomplished with a specialized semiconductor transceiver capable of both driving and receiving optical energy, or by optical means where a beam-splitter or other suitable technique is applied to allow transmission and reception to occur across the single bidirectional channel.

Although the methods and systems are described herein relative to specific embodiments, they are not so limited. For example, in the context of the example air vehicle described in the "Aircraft" subsection below, the methods and systems may be applied to a variety of multirotor vehicles having 4, 6, 8, 10, 12, 14, 16, or more, independent motor controllers and motors, thus providing differing amounts of lift and thus payload and operational capabilities. The system may be operated under an operator's control, or it may be operated via network or datalink from the ground. The vehicle may be operated solely with the onboard fuel-cells or battery storage capacity, or it may have its capacity augmented by an onboard motor-generator or other recharging source, or it may even be operated at the end of a tether or umbilical cable for the purposes of providing energy to the craft. Many modifications and variations of the disclosed methods, systems, and devices may become apparent to those skilled in the art in light of the teachings herein, and many additional changes in the details, materials, and arrangement of parts, herein described and illustrated, may be made by those skilled in the art without undue experimentation using knowledge common in the art.

Consequently, various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

EXAMPLES

Controller Area Network (CAN) Protocol

As discussed above, the CAN protocol (hereinafter, simply "CAN" for short) is one of a number of standards for distributed communications with built-in fault handling, specified for the physical and data link layers of the open systems interconnection (OSI) model in ISO-11898-1, -2. CAN has been widely adopted in industrial and instrumentation applications and the automotive industry due to the inherent strengths of the communication mechanisms used by CAN. The present disclosure demonstrates aspects of the present disclosure using features of CAN and increasing performance and safety and signal integrity by implementing CAN in a unique fiber-optic link architecture, making it ideally suited for safety-critical system applications in aircraft and other high EME applications.

CAN for industrial control applications commonly utilizes a 2-wire physical layer network for bidirectional communications across a single twisted pair of wires. In older forms of differential data transmission (such as RS-485), Logic 1 is transmitted as a high on one noninverting transmission line and a low on the inverting line. Correspondingly, Logic 0 is transmitted as a low on the noninverting line and a high on the inverting line. The receiver uses the difference in voltage between the two lines to determine the Logic 1 or Logic 0 that was transmitted. A driver on an RS-485 bus can also be in a third state, with the driver outputs in a high-impedance state. If all nodes are in this condition, the bus is in an idle state. In this condition, both bus lines usually sit at a similar voltage with a small differential.

Physical-layer signaling for CAN in industrial applications differs in that there are only two bus voltage states, namely, recessive (driver outputs are high impedance) and dominant (one bus line, CANH, is high and the other, CANL is low). Transmitting nodes transmit the dominant state for Logic 0 and the recessive state for Logic 1. An idle CAN bus is distinguished from a recessive bit transmission simply by detection of multiple recessive bits after an end of a data frame or error frame. This signaling method is basic to all aspects of CAN networks for node arbitration and prioritization of messages so that each node can contend for the network and the highest priority node (the highest message ID) will obtain access to the network, and all other lower priority nodes will back off and retry later.

The structure of a CAN message is fundamental to the schemes that CAN uses for achieving robust communications through error detection, as well as the inherent prioritization of messages and multiple-driver capability based on bitwise arbitration. A CAN controller may handle the framing of CAN messages, for example, as specified in CAN 2.0b (for the inclusion of the extended message type). Signaling for CAN messages at the physical layer comprises leaving the bus in a high impedance recessive state for a transmission of Logic 1 and transmitting a differential high/low dominant state for a transmission of Logic 0.

On any CAN network, any node can transmit data. Nodes arbitrate for use of the network so that, in the event of two or more nodes attempting transmission, messages are transmitted one after another according to their priority. Nondestructive and transparent arbitration is possible because transmission of a dominant bit overwrites the recessive bus state. The CAN controller of each node monitors the bus as it transmits and, consequently, can detect if another node wins arbitration. "Nondestructive and transparent" means that messages are not corrupted, and transmission of the highest-priority message is uninterrupted and not delayed by arbitration. If the bus is active (a node is transmitting or has just finished transmission), no other nodes will attempt transmission. If, when the bus is idle (for at least the length of the interframe spacing) and more than one node begins transmission, arbitration occurs transparently and nondestructively. Nondestructive arbitration means that the node winning arbitration can simply continue transmitting its message without any other node having interfered with the message transmission.

The intricacies of arbitration and signaling are fundamental to successful operation of the CAN network and establish the requirements for translating a CAN 2-wire signal into the fiber-optic medium, and back again. Additional detail on CAN is available from the ISO 11898-2 standard and other CAN publications. In this CAN example, the arbitration and signaling capabilities are maintained across the fiber-optic link while applying the necessary EMI, HIRF, lightning, and noise suppression design features that are critical to safe and reliable operation of the CAN network, which may be, for example, an aircraft flight control or other vehicle control network, among others. Also in the example, a hybrid wire/fiber network of the present disclosure allows multiple devices to exist and communicate on a fiber-optic sub-net up to the limits of path length timing imposed by the CAN standards.

For some embodiments, an aspect of the present disclosure is CAN-bus arbitration logic needed to prevent the CAN buses on both sides of a fiber-optic link from getting stuck in the dominant state due to the loopback function inside typical CAN-transceiver devices. The arbitration logic detects which of the two CAN-bus sides is entering the dominant state first. Based on the detection of the first CAN-bus side to enter the dominant state, the arbitration logic blocks the now-secondary CAN-bus side from also asserting dominant state due to the loopback. Once the first CAN bus releases the dominant state, the arbitration logic starts a time delay. After the time delay expires, the block of the secondary side is removed. The arbitration logic works in both CAN-bus directions. The delay function provides an asymmetric delay of the CAN bus line transition. The example physical embodiment described herein has a delay of only 210 ns from dominant state to recessive state and no delay from recessive state to dominant state. The asymmetric delay, such as the 210 ns delay of this example, is needed to support higher CAN data rates, as high as 2 Mbps. The CAN-bus side that stays longer in the dominant state wins the bus arbitration, and the CAN-transceiver device that enters recessive state goes back to receive mode. In this way, the integrity of the bus arbitration process is maintained across the fiber-optic link. Other time delay settings are of course possible, as determined by the intended signaling rate.

CAN is available in several differing protocol stacks, including CAN 2.0, DeviceNet, CANopen, and others, but generally utilizes a 2-wire physical-layer topology. In this way, any CAN-protocol variant can operate using features disclosed herein. In aircraft applications, there can be long links that can cause the ground potential at different nodes on the network to be significantly different, especially when high currents and corresponding resistive and inductive voltage drops are present across the power conductors. This causes ground currents to flow through the path of least resistance through either the common earth ground (typically the vehicle chassis) or the ground wire. In addition, lightning strikes, HIRF, EMI, and/or switching noise from motors, inverters, and other electrically noisy equipment can introduce additional ground noise into the system. Ground noise can occur due to multiple sources at the same time and is thus a major potential issue in vehicle systems design, leading to added weight for cable shielding, electrical bonding within the structure, and the significant risk of signal upset at any given time.

Aircraft

An illustrative embodiment of the present disclosure relates to an integrated system and related method for adapting CAN networks to and from fiber optics to extend and provide complete electrical isolation (sometimes referred to as "fly by light") for use in an example multirotor aircraft.

To save weight, many aircraft systems employ the airframe or chassis to provide the return current path for major onboard power systems. Currently, +28 V power is the most common voltage standard among general aviation and small aircraft avionics and control systems, where the 28 V source is locally stepped down to +5 V, +12 V, and other voltage levels for the various component systems as required. Those skilled in the art will readily appreciate that other voltage standards apply for other types of vehicles, typically, but not necessarily, ranging from +12 V in automotive, to +24 V or +48 V in other types of systems. The use of varying voltages and grounds is likely to increase the impedance of the chassis ground, and the ground currents from numerous sources are more likely to find their way into the ground path of the network link. Given enough ground noise at one end, the signal integrity on the typical twisted-wire-pair bus can be degraded or overridden by noise, causing network transmission errors. A number of military aircraft crashes have been shown to have occurred due to electrical or EMI interference. Providing some form of galvanic isolation is a mitigation solution if there is no guarantee that the potential at the chassis grounds at differing nodes in the system are within the common-mode range of the network transceiver. Fiber-optic links provide complete galvanic isolation and allow unimpeded information flow but prevent current flow or ground-noise accumulation, thus isolating the network logic levels from the ground-potential differences and system noise.

In this example, a fiber-optic network is used to implement total galvanic isolation for the network protocol in aircraft avionics and control systems, in this illustrative case, CAN. Data from a flight control computer, messaged using CAN (but which could employ other protocol stacks or different physical layers and/or arbitration means with suitable wire-side interfaces) is converted from the 2-wire CANH/CANL format into a dedicated fiber-optic format and transmitted via light pulses to a receiving node, for illustration purposes at a fuel cell or a high-voltage motor controller, or some other network device within the vehicle (in this example, an aircraft or eVTOL) system. At the receiving node, the transmitted light pulses are converted back into the 2-wire CAN format, and the network message is received and acted upon by the receiving node. When the receiving node needs to return status or acknowledgements, it sources its CANH/CANL message to contest for the network via arbitration. That data is converted from the 2-wire CANH/CANL format into the dedicated fiber-optic format and transmitted via light pulses to another destination node. At the destination node, the transmitted light pulses are converted back into the 2-wire CAN format, and the network message is received and acted upon by the destination node. In some embodiments, each conversion and transmission/receipt is accomplished in about 60 nanoseconds to minimize the signaling delay. Since the CAN network operates at 1 Mb/s (1000 nS per frame) in this illustrative example, the delay is well within the allotted signaling time.

Aircraft systems have traditionally employed mechanical cables, push-rods, and/or hydraulic pumps and actuators for primary flight controls with large amounts of shielded twisted-pair, point-to-point cabling and connectors for sensors, controls, avionics, engine full-authority digital engine control (FADEC) controls and environmental equipment. Most of these equipment and interconnections are heavy and costly, and much is labor- and maintenance-intensive and subject to degradation from corrosion over time. While the current state-of-the-art production aircraft incorporate fly-by-wire (e.g., commercial airliners such as the Boeing 777, 787, Airbus A380, etc.), these systems still involve large, complex systems of wiring, cabling, shielding, and electronics controlled by a complex centralized flight-control computer. Today's systems are also faced with increasingly hostile EMI and HIRF environments, where broader use of the electromagnetic spectrum for 4G and 5G cellular network and WI-FI® technologies and beyond is in direct conflict with electrically connected avionics, displays, sensors, and actuators. This requires that wired systems incorporate complex and heavy shielding and twisted-pair wiring for most cable harnesses in order to protect sensitive electronics and forces maintenance of a "clean" electrical ground among communicating equipment.

Advantages of Fiber Optics: In this example, the network architecture enabled by fiber-optic transceivers represents a major change in philosophy versus fly-by-wire systems, which rely on copper connections to transmit signals, and versus centralized flight-control systems that rely upon the collection, processing, and distribution of large volumes of information to sense and implement actuator control loops. The distributed-intelligence approach allows simple and flexible modification and/or expansion of the sensor and actuator systems and simplifies the task for flight-management systems, since most sensor processing and actuator-loop closure can be accomplished at intelligent remote locations. The architecture's flexibility allows integration with existing electromechanical and/or electrohydraulic actuators, avionics suites, and with most aircraft sensors and utility controls.

Benefits to Civil and General Aviation: Advantages for civil (typically above 19 seats) and general (typically 19 seats or less) aviation include, but are not limited to: improved flight performance and safety; reduced cost and weight; reduced aircraft design time; reduced parts count and mechanical complexity; reduced wire harness complexity; reduction or elimination of shielding and grounding problems; improved reliability and maintainability; increased range and payload; optimization of engine and flight performance; large reductions in electrical disturbances from lightning, EMI, grounding, or HIRF; automated flight safety modes; reduced certification costs through box-level certification; enhanced diagnostics capabilities; ease of installation; and integration and configuration flexibility, among others.

As one example intended to demonstrate the application of a hybrid wire-fiber network of the present disclosure, such a network can be applied to a full-scale vertical takeoff and landing manned or unmanned aircraft having a lightweight airframe. The airframe, in turn, may contain, for example: batteries, or a motor-generator set, or fuel cells, or a subsystem that converts water or hydrogen to energy and is used to generate electricity from fuels such as liquid propane gas (LPG), compressed natural gas (CNG), or hydrogen; an electric lift-and-propulsion system mounted to a lightweight multirotor upper truss or frame or boom structure; counter-rotating pairs of AC or DC brushed or brushless electric motors each driving a propeller or rotor; an integrated "highway in the sky" avionics system for navigation; a redundant autopilot system to manage motors and maintain vehicle stability; an optional tablet-computer-based mission planning and vehicle control system to provide the operator with the ability to pre-plan a route and have the system fly to the destination via autopilot or to directly control thrust, pitch, roll and yaw through movement of the tablet computer; and automatic dependent surveillance-broadcast (ADS-B) or ADS-B-like capability to provide traffic and situational awareness, weather display and collision avoidance warnings.

Power may be provided by one or more onboard motor-generators for generating electrical voltage and current, or by batteries, or by an onboard fuel cell or other means for generating electrical voltage and current, electronics to monitor and control electrical generation, and motor controllers to control the commanded voltage and current to each motor and to measure its performance (which may include such metrics as resulting RPM, current, torque and temperature among others). As a multirotor electric aircraft, the vehicle does not fall into the standard "fixed wing" or "helicopter" or "lighter-than-air" categories and requires a new classification scheme in coordination with the Federal Aviation Administration and foreign regulatory authorities. Note also that a hybrid wire-fiber network of the present disclosure is equally applicable to other types of electric-motor air vehicles, such as fixed wing single or multiple-engine aircraft, rotating wing-body designs that transition from rotor-borne flight to wing-borne flight and back again, or other types of air vehicles powered by electric motors. In all cases, the addition of fiber optic or fly-by-light technology enhances safety and reliability, while reducing weight and grounding or bonding complexity.

In the example configuration, lift is provided by pairs of electric motors driving directly-connected and/or gear-reduced pairs of counter-rotating propellers, also referred to as "rotors." The use of counter-rotating propellers on each pair of motors cancels out the torque that would otherwise be generated by the rotational inertia. Automatic computer monitoring by a programmed redundant digital autopilot computer controls pitch, bank, yaw and elevation, while simultaneously using onboard inertial sensors to maintain vehicle stability and restrict the flight regime that the pilot or route planning software can command, to protect the vehicle from inadvertent steep bank or pitch, or other potentially harmful acts that might lead to loss of control. Sensed parameter values about vehicle state are used to detect when recommended vehicle operating parameters are about to be exceeded. By using the feedback from vehicle state measurements to inform motor control commands, and by voting among redundant autopilot computers, the methods and systems contribute to the operational simplicity, stability, reliability, and safety of the vehicle.

In the example configuration, flight-control computers connect to fuel cells, pumps, and inverters or motor controllers over a digital network, in this example a CAN network, and send commands to and monitor status hundreds of times per second for each of the subject devices, thus varying the torque or thrust produced by each motor and its attached rotor, and resulting to physical changes to the altitude, bank, pitch, and/or yaw movement of the air vehicle. In the example configuration, the flight control computers also send commands to and monitor the status hundreds of times per second not only for each of the fuel cells but also their supporting cooling pumps, fans, and air blowers or turbo-chargers, thus varying the current produced by each fuel cell at a known or calculated voltage and current, so as to ensure the proper amount of power is available to each motor controller and its attached motor and rotor for the commanded rotor RPM or torque. It is imperative that the network messages be received in a timely, orderly, and error-free condition in order to assure the responsiveness and the continued safe operation of the vehicle.

Among the many uses for this class of vehicle are the next generation of personal transportation including commuting, local travel, air taxi, cargo transport, and recreation where operators need not have the level of piloting skills necessary for more complex traditional aircraft or helicopters. This evolution is typically referred to as Personal Air Vehicles (PAV) or Air Mobility Vehicles (AMV). In this example, such an air vehicle can also have autonomous or unmanned application to aerial surveillance, security and reconnaissance, policing, and package or supplies delivery that will be of utility to law enforcement, border patrol, military surveillance, emergency relief aid (disaster recovery), and commercial users, among others.

The example air vehicle is equipped with redundant autopilot computers to accept control inputs by the operator (using a tablet computer's motion to mimic throttle and joystick commands, or using throttle and joystick devices directly) and manage commands to the electric motor controllers, advanced avionics and global positioning system (GPS) equipment to provide location, terrain, and "highway in the sky" displays, and a simplified, game-like control system that allows even casual users to master the system after a brief demonstration flight. An optional computer (e.g., tablet-type computer) provides mission-planning and vehicle-control system capabilities to give the operator the ability to pre-plan a route and have the system fly to the destination via autopilot, or manually control thrust, pitch, roll, and yaw through movement of the computer itself. Control inputs can alternatively be made using a throttle or joystick for vertical lift (propeller RPM) control and a joystick for pitch (nose up/down angle) and bank (angle to left or right) and yaw (rotate left or right) control, or a pair of multi-axis joysticks to combine pitch, bank, yaw and thrust in a pair of control elements, depending on user preferences. The flight-control computer measures control inputs by the operator or autopilot directions, translates this into commands to the controllers for the individual electric motors according to a known performance table, and then supervises motor reaction to said commands, and monitors vehicle state data (pitch, bank, yaw, pitch rate, bank rate, yaw rate, vertical acceleration, lateral acceleration, longitudinal acceleration, GPS speed, vertical speed, air speed and other factors) to ensure operation of the vehicle remains within the desired envelope.

FIGS. 1-8 illustrate an example embodiment or embodiments of a method, apparatus, and system for implementing a hybrid wire-fiber data network and transceiver system according to aspects of the present disclosure. Although FIGS. 1-8 are directed to specific example embodiments, it should be understood that many alternative embodiments are possible by implementing aspects of this disclosure. One of skill in the art will additionally appreciate that a variety of different ways exist to alter the parameters of the embodiments disclosed, such as, but not limited to, the size, shape, and/or type(s) of elements or materials, the underlying media-access protocol(s), the means of bitwise or contention arbitration among nodes on the network(s), as well as the type of aircraft, automobile, vehicle, or other platform, in manners that keep with the spirit and scope of the present disclosure.

FIG. 1 illustrates an example PAV 100 that implements a hybrid wire-fiber data network 104 in accordance with various aspects of the present disclosure. In this example, the PAV 100 includes a multi-redundant flight-control computer system 108, which in this example uses three redundant flight-control computers (not shown, but see, e.g., FIG. 3). The PAV 100 of this example includes four fuel cells 112(1) to 112(4) (collectively, 112), six electric motor/propeller (prop) assemblies 116(1) to 116(6) (collectively, 116), and six motor controllers 120(1) to 120(6) (collectively 120) corresponding respectively to the six electric motor/prop assemblies. The number of fuel cells will vary, depending upon their power and voltage capabilities, and varying needs for redundancy. The PAV 100 utilizes the hybrid wire-fiber data network 104 for data communication between the flight-control computer system 108 and the fuel cells 112(1) to 112(4) and between the flight-control computer system and the motor controllers 120(1) to 120(6). Further details regarding this example are discussed below in connection with FIGS. 2 through 8. In one example, the hybrid wire-fiber data network 104 may be composed of one or more dual-fiber-optic links (not shown) with one or more wire-fiber transceivers (not shown) each proximate to the flight-control computer system 108 and one or more wire-fiber transceivers (not shown) each proximate to the fuel cells 112(1) to 112(4) and the motor controllers 120(1) to 120(6).

Figure 2:
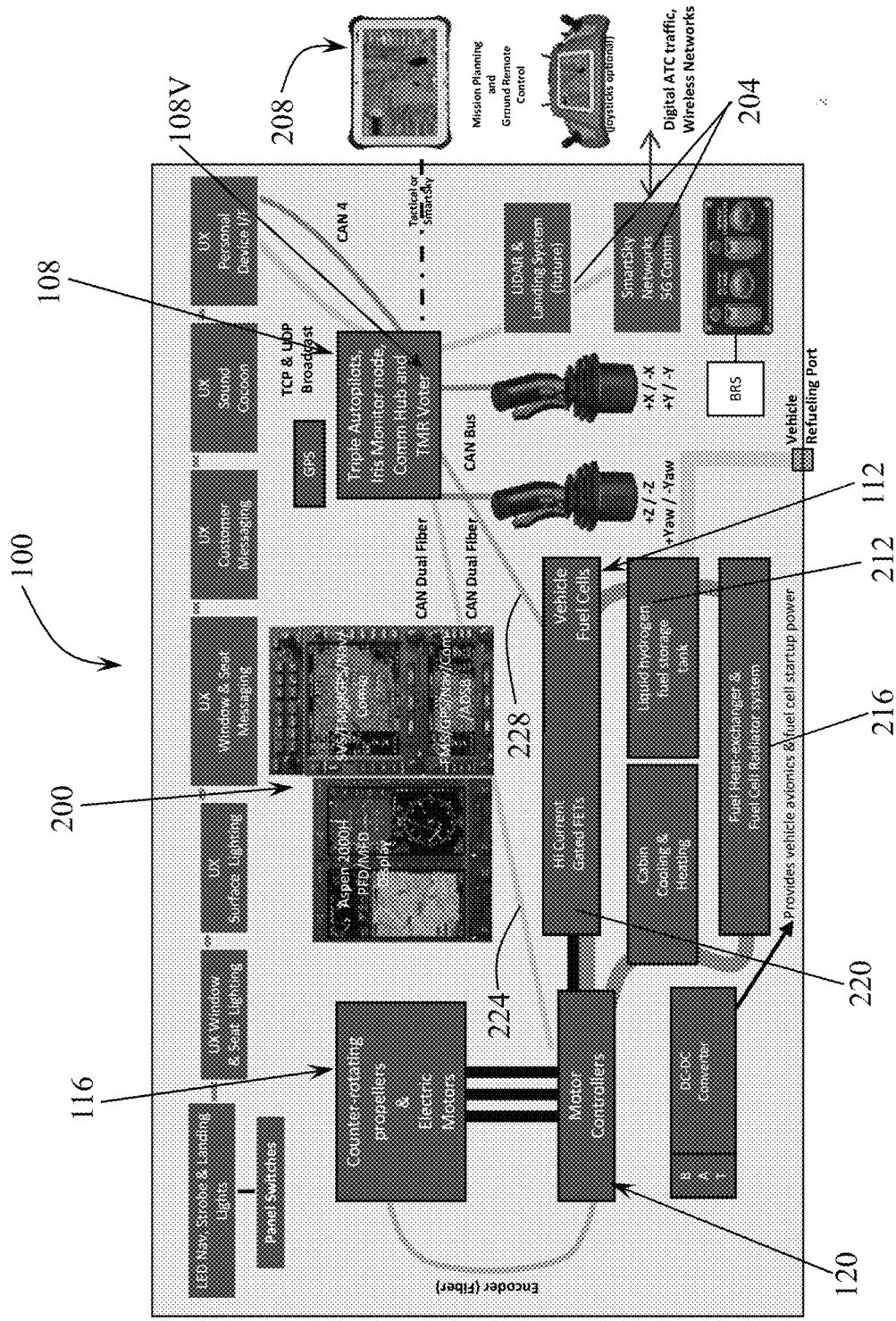
FIG. 2 is a diagram illustrating various subsystems of the example air vehicle of FIG. 1 and their interconnections to one another via a hybrid wire-fiber data network of the present disclosure that uses a controller area network (CAN) bitwise arbitration type protocol.

FIG. 2 depicts an alternative view of various features of the example PAV 100 of FIG. 1. The PAV 100 may include the motor/prop assemblies 116(1) to 116(6), primary flight displays 200, an Automatic Dependent Surveillance-B (ADS-B) or remote ID transmitter/receiver 204, the multi-redundant flight-control computer system 108, mission-control system or sidearm controllers 208, and mission-planning software (not shown), among other things. In each case, the mission-control system or sidearm controllers 208 may transmit the designated route or position command set or the intended motion to be achieved to the multi-redundant flight-control computer system 108 and a corresponding voter 108V, the motor controllers 120, and an air data computer (not labeled) to calculate airspeed and vertical speed. In some embodiments, fuel storage 212 (e.g., liquid hydrogen storage), an avionics battery (not shown), the fuel pump and cooling system 216, an engine supercharger or turbocharger (not shown), and a starter/alternator may also be included, monitored, and controlled. Any engines and generator sets or fuel cells 112 are fed by onboard fuel (not shown) from the fuel storage 212 and use the fuel to produce a source of power for the PAV 100. These components are configured and integrated to work together with a 4D flight management system to auto generate and execute routes from minimal input so that a user does not need expertise to define a proper route.

Full envelope protection has been developed and implemented so that neither users nor environments can push the vehicle outside of safe flight envelope and operating conditions. Envelope protection offers a safer system for protecting occupants, developed using wake vortex modeling, weather data, and precisely designed redundant algorithms incorporating the highest standards available for performance and safety. The goal is that there is nothing the vehicle, a human operator/supervisor/passenger, or the environment can do that would push the vehicle out of its safety envelope unless or until there is a failure in some aspect of the system.

The motors of the motor/prop assemblies 116 in a particular embodiment may be brushless synchronous three-phase AC or DC motors that are capable of operating as an aircraft motor and are air-cooled, liquid-cooled, or both. These motors and fuel cells 112 generate excess or waste heat from forces including electrical resistance and friction, and so this heat may be subject to management and thermal energy transfer. In one embodiment, the motors (FIG. 3, 116M) are connected to a separate cooling loop or circuit (not shown) from the fuel cells 112. In another embodiment, the motors (FIG. 3, 116M) are connected to a shared cooling loop or circuit (not shown) with the fuel cells 112.

The example PAV 100 implements pre-designed fault tolerance or graceful degradation that creates predictable behavior during anomalous conditions with respect to at least the following systems and components: 1) flight-control hardware; 2) flight-control software; 3) flight-control testing; 4) motor-control system; 5) motors; and 6) fuel-cell or other power-generation systems.

The flight-control hardware may comprise, for example, a redundant set of PIXHAWK® flight controllers with 32-bit or 64-bit ARM processors or a triple-redundant set of flight-control computers (FCCs) 108(1) to 108(3) (FIG. 3), or a triple- or quad-redundant set of flight control hardware and software. The vehicle may be configured with multiple flight controllers, commonly at least three (3) disposed inside the vehicle for redundancy. Each computer may comprise: three (3) accelerometers, three (3) gyros, three (3) magnetometers, two (2) barometers, and at least one (1) GPS device, although the exact combinations and configurations of hardware and software devices may vary. Sensor voting algorithms internal to each PIXHAWK® or other FCC(s) select the best value from each sensor type and handle switchovers/sensor failures. Flight-control software comprises at least one proportional-integral-derivative (PID)-style algorithm that has been developed, for example using 1) computer aided design (CAD) data, 2) finite element analysis (FEA) data; and 3) actual propeller/motor/motor controller/fuel cell performance data measurements.

An example embodiment is shown for the vehicle's six motor/prop assemblies 116, with each motor controlled by a dedicated motor controller 120. Electrical operating characteristics/data for each motor are controlled and communicated to the voter 108V for analysis and decision making. Communication to the motor controllers 120 happens (in this embodiment) between the autopilot and the motor controllers via CAN using a hybrid wire-fiber data channel 224, which may be considered a portion of the hybrid wire-fiber data network 104 of FIG. 1, inline to protect signal integrity and avoid ground differentials common when working with high-voltage switching devices. Other media-access protocols could also or alternatively be employed, for example, depending in some part upon availability, commonality, and wide industry acceptance. In this embodiment, the use of fiber optics, sometimes known as "fly by light" as noted above, increases vehicle reliability and reduces any vulnerability to ground differentials, voltage differentials, electromagnetic interference, lighting, and external sources of electromagnetic interference, such as television (TV) and/or radio broadcast towers, airport radars, airborne radars, and similar potential disturbances. Measured parameters related to motor performance include motor temperature, insulated-gate bipolar transistor (IGBT) temperature, voltage, current, torque, and RPM. Values for these parameters in turn correlate to the thrust expected under given atmospheric, power, and pitch conditions.

The fuel-cell system may have various numbers of fuel cells 112 based on the particular use configuration, for example, a set of three to six hydrogen fuel cells (here four fuel cells 112(1) to 112(4) as seen in FIG. 1) configured for fault tolerance. Operation and control of the cells is enabled and managed using CAN, although numerous other data bus and control techniques are possible and will be apparent to one skilled in the art. Communication to the fuel cells happens (in this embodiment) between autopilot and fuel cell-subsystems via CAN using a hybrid wire-fiber data channel 228, which may be considered a part of the hybrid wire-fiber data network 104 of FIG. 1), inline to protect signal integrity and avoid ground differentials common when working with high-voltage generation devices. Other media-access protocols could also or alternatively be employed, for example, depending in some part upon availability, commonality, and wide industry acceptance. One or more flight-control algorithms stored within the autopilot control and monitor the power delivered by the fuel cells 112 via CAN. The triple-modular redundant auto-pilot can detect the loss of any one fuel cell 112 and reconfigure the remaining fuel cells 112 using a form of cross connection or other arrangement, thus ensuring that the fuel-cell system is capable of continuing to operate the aircraft to perform a safe descent and landing. When one or more operating parameters are exceeded to a significant extent or past one or more preset limits or emergency conditions exist such that a safe landing is jeopardized, the integrated emergency procedures are activated, and the deployment of an inter-rotor ballistic airframe parachute will be triggered.

Figure 3:
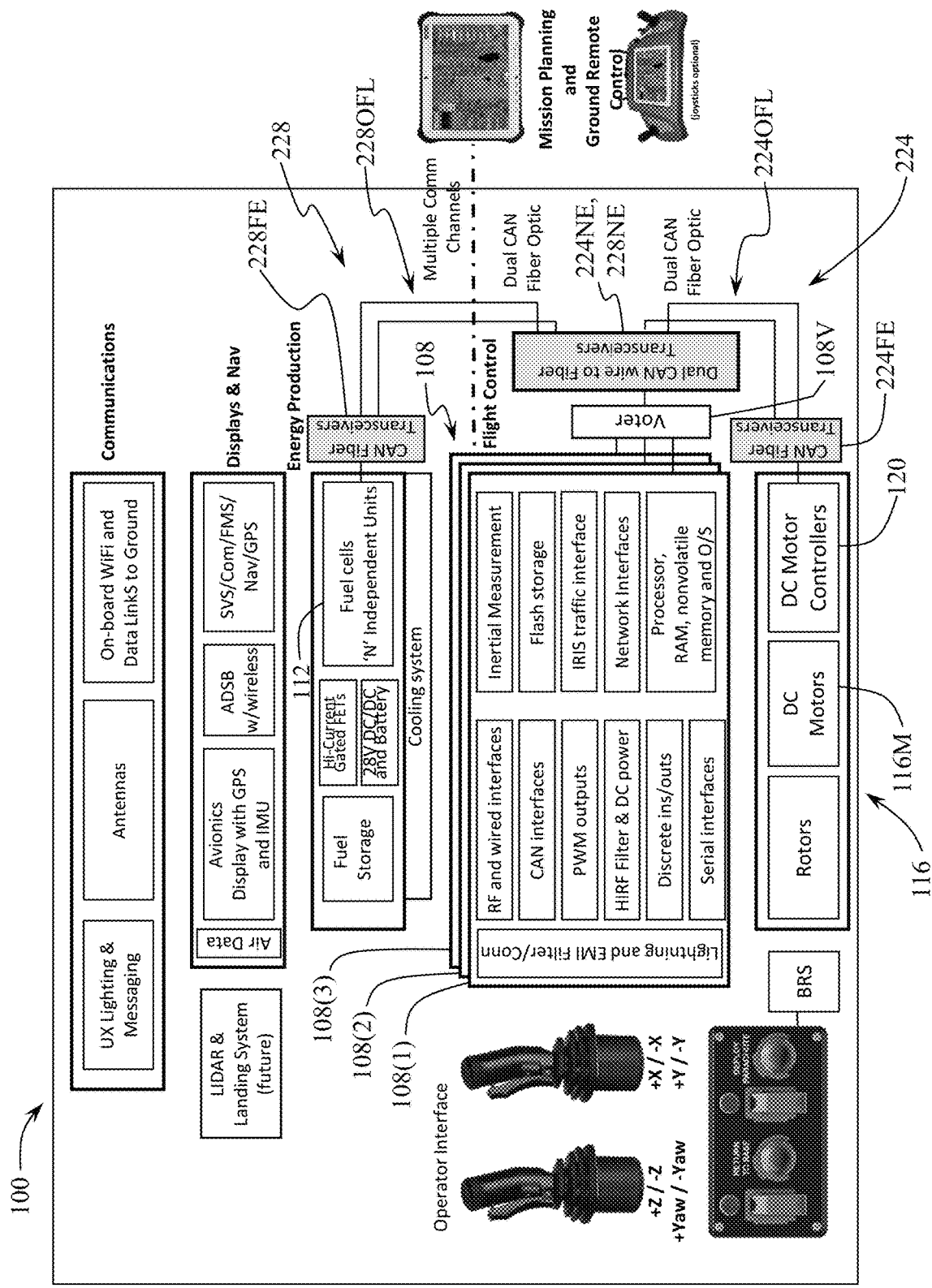
FIG. 3 is diagram illustrating various subsystems of the example air vehicle of FIG. 1, including a multi-redundant flight-control-computer and voting system.
Figure 4A:
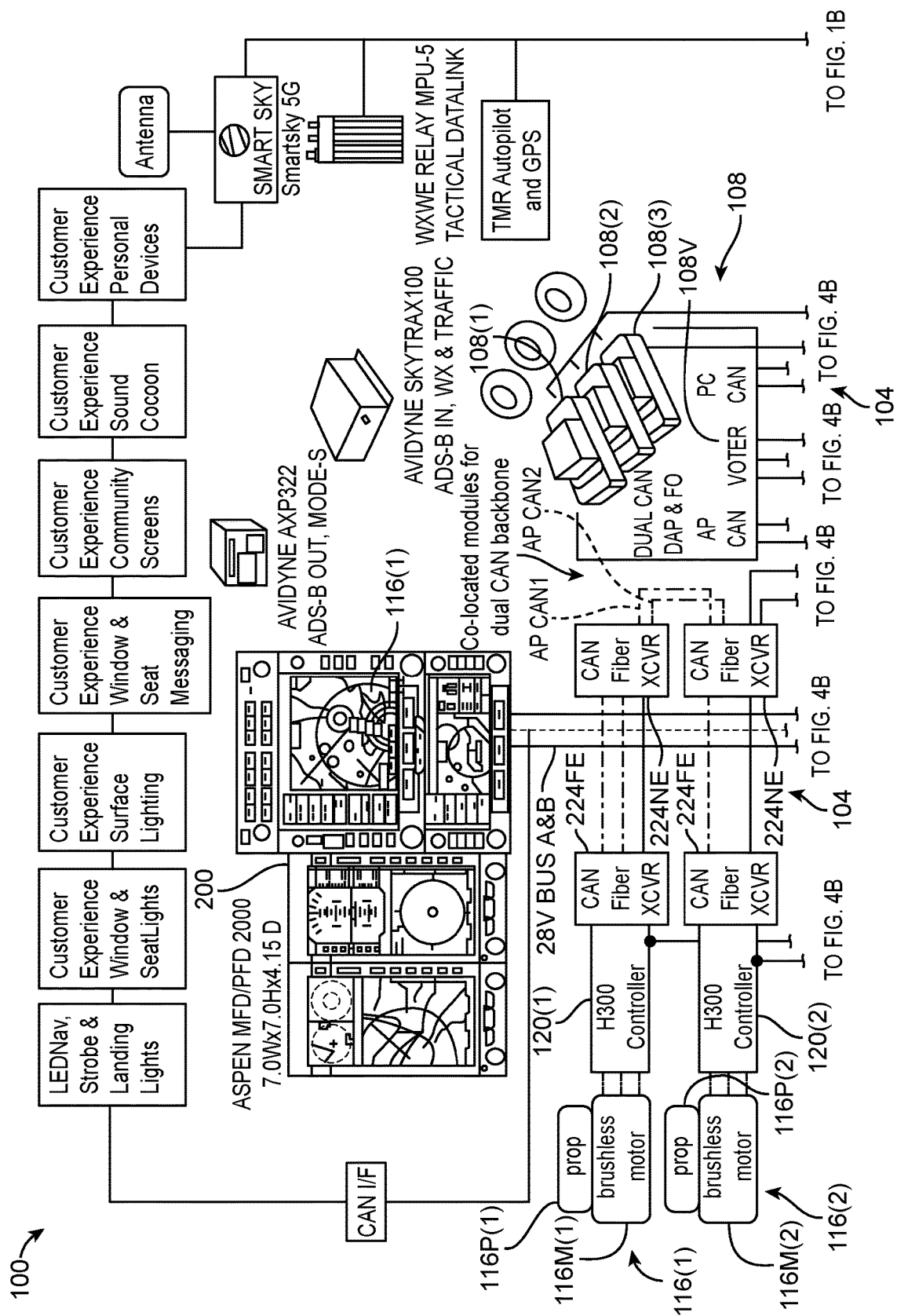
FIGS. 4A-4D combine with one another to provide a schematic/high-level composite diagram illustrating corresponding respective portions of the example air vehicle of FIG. 1.
Figure 4B:
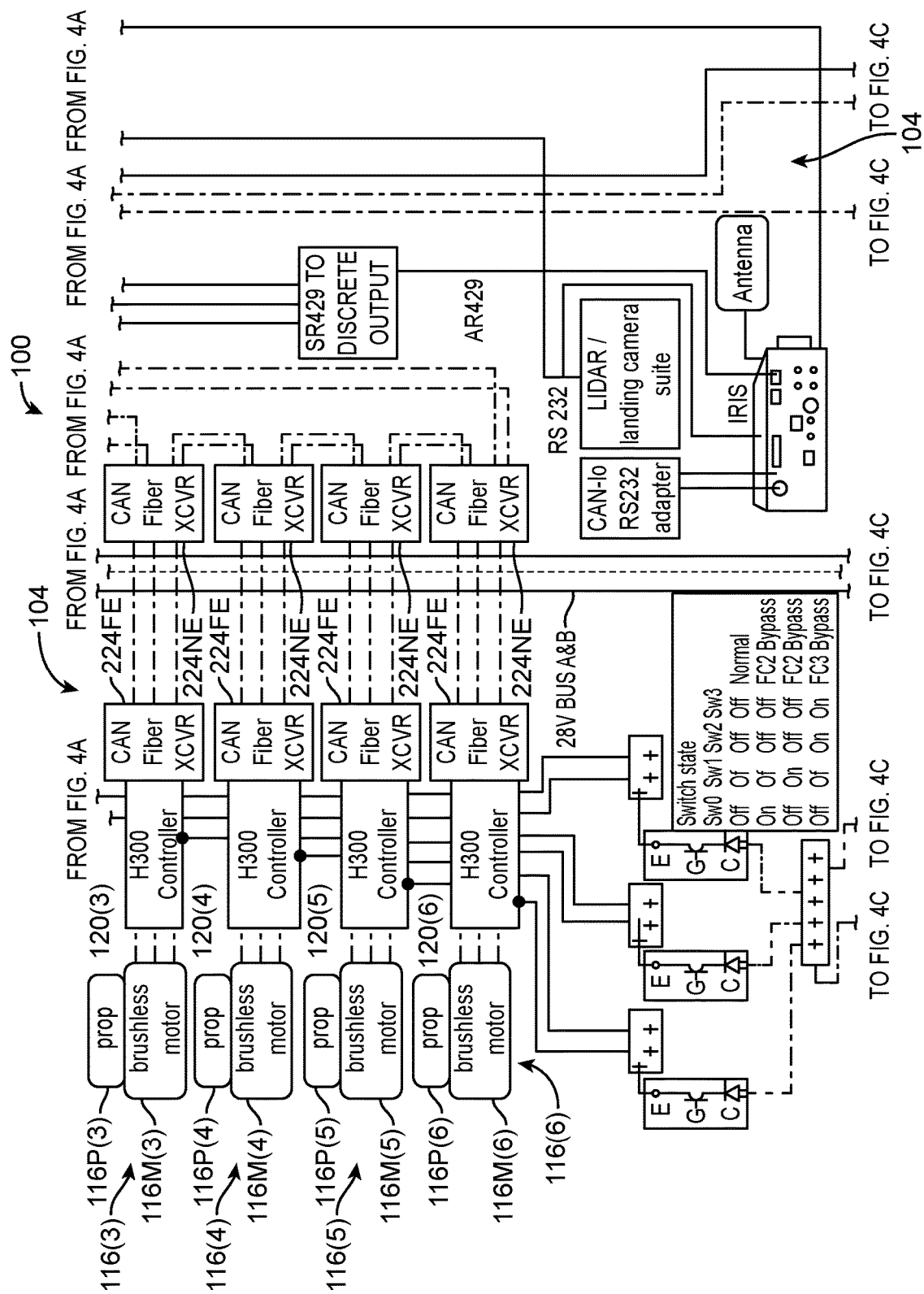
Figure 4C:
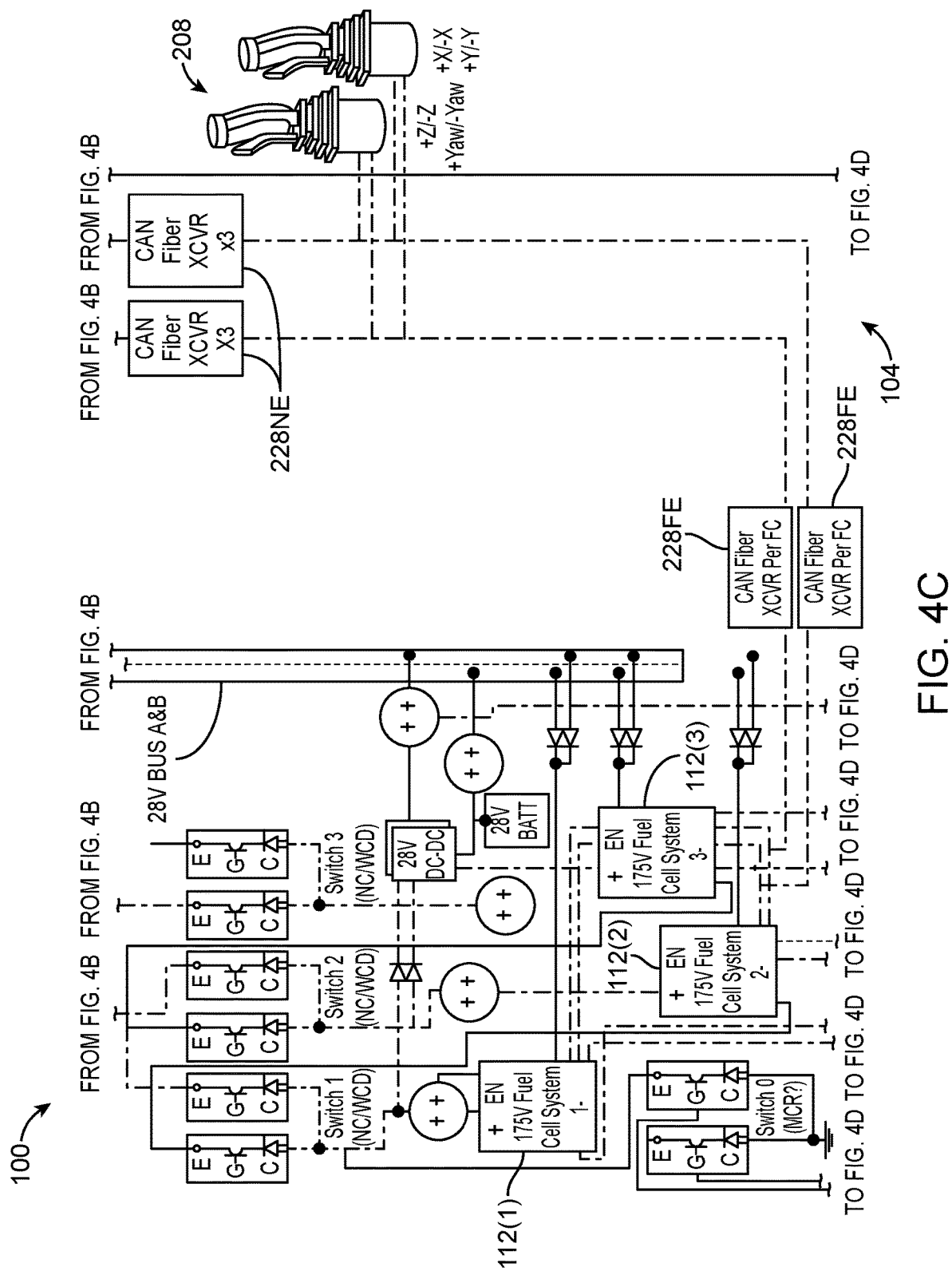
Figure 4D:
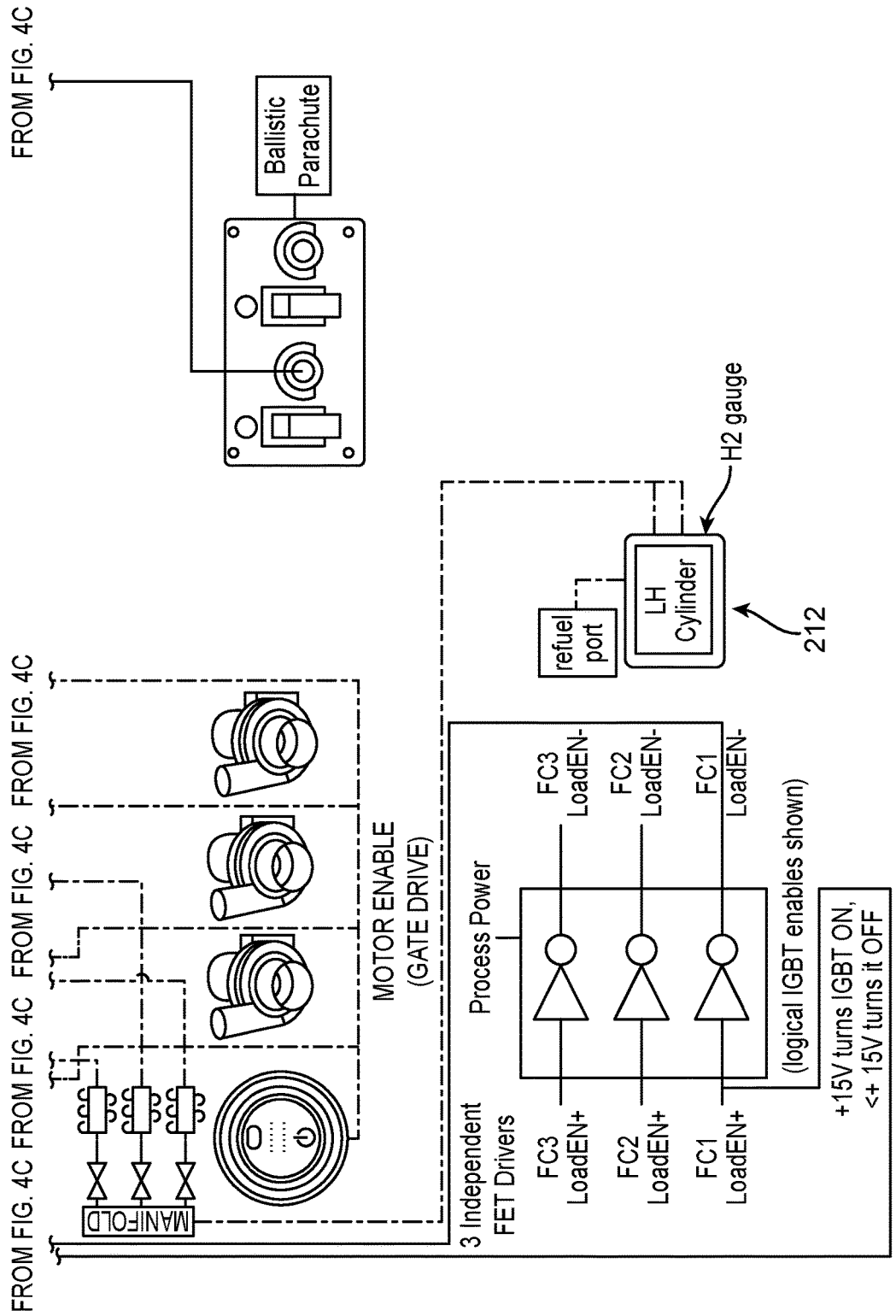

FIG. 3 depicts another alternative view of various features of the example PAV 100 of FIG. 1, including one example of a voting process that is implemented via the voter 108V with fault-tolerant, triple-redundant voting control and communications means to perform the qualitative decision process. Since there is no one concise "right answer" in this real-time system, the multi-redundant flight-control computer system 108, here composed of three redundant flight-control computes 108(1) to 108(3), instead shares flight-plan data and the desired parameters for operating the flight by cross-filling the flight plan, and each flight-control computer measures its own state-space variables that define the current aircraft state and the health of each node on the network(s). Each flight-control computers 108(1) to 108(3) independently produces a set of motor-control outputs (in CAN message format in the described embodiment), and each flight-control computer 108(1) to 108(3) assesses its own internal health status. The results of the health-status assessment are then used to select which of the flight-control computers actually are in control of the motors 116M of the motor/prop assemblies 116. Other arrangements and techniques for voting among the flight-control computers 108(1) to 108(3) are possible, as will be apparent to those skilled in the art. The elected set of motor-control outputs is communicated from the voter 108V to the motor controllers 120 via the hybrid wire-fiber data channel 224, which includes a near-end (or "first") wire-fiber transceiver 224NE, a far-end (or "second") wire-fiber transceiver 224FE, and a dual-optic-fiber link 2240FL between the two wire-fiber transceivers.

Similarly, communications between the flight-control computers 108(1) to 108(3) and/or the voter 108V to and from the fuel cells 112 occurs over the hybrid wire-fiber data channel 228, which includes a near-end (or "first") wire-fiber transceiver 228NE, a far-end (or "second") wire-fiber transceiver 228FE, and a dual-optic-fiber link 2280FL connecting the two wire-fiber transceivers with one another. Similar uses may include CAN connections to sidearm controllers and/or to other aircraft subsystems.

FIGS. 4A-4D illustrate additional example details of the PAV 100 of FIGS. 1-3 that may be employed to carry out various aspects of the present disclosure and provide additional and/or other functionalities to the PAV. As discussed above, this example illustrates a six-person PAV 100, which could alternatively be an unmanned aerial vehicle (UAV), that includes, among other things, onboard equipment such as: the primary flight displays 200; the ADS-B or Remote ID transmitter/receiver 204; a GPS receiver (not shown, but typically embedded within the primary flight displays); a fuel gauge an air data computer to calculate airspeed and vertical speed mission-control tablet computers 208 and corresponding mission-planning software (not shown); and the multi-redundant flight-control computer system 108 (also referred to as "autopilot computers"). All of this equipment generally monitors either the operation and position of the PAV 100 or monitors and controls the motors 116M(1) to 116M(6) via the motor controllers 120(1) to 120(6) and the fuel system (e.g., the cells 112(1) to 112(4) and the fuel storage 212) and provide display presentations that represent various aspects of those systems' operation and the PAV's state data, such as altitude, latitude, ground speed, position, local terrain, recommended flight path, weather data, remaining fuel and flying time, motor voltage and current status, intended destination, and other information necessary to a successful and safe flight.

It is noted that the illustrated hydrogen-powered fuel-cell subsystem may be replaced by an engine and generator set or battery or other power source to generate electricity as desired to achieve a desired design goal. In an example, the fuel-cell subsystem may combine stored hydrogen with compressed air to generate electricity with a byproduct of only water and heat, thereby forming an engine and generator set or fuel cell. The engine and generator set/fuel cell can also include a fuel pump, a cooling system, and an engine supercharger to optimize the efficiency and/or performance of the engine and generator set/fuel cell. As would be appreciated by one skilled in the art, the engine and generator set may also be replaced by a battery subsystem that may comprise a high-voltage battery array and battery monitoring and charger subsystem, though such a configuration would not be fuel-cell based. This example is meant to address both kinds of power generation systems as well as stored-energy battery systems. For purposes of illustration only, the present description focuses on a fuel-cell form of electricity generation.

FIGS. 4A-4D depict a production-level system, including logic controlling the emergency descent system, and inter-rotor ballistic parachute (BRS (Ballistic Recovery System)). Wire-to-fiber transceivers 224NE, 224FE, 228NE, and 228FE, discussed more below, compose the hybrid wire-fiber data network 104 of this embodiment and provide the primary and secondary network connection to the fuel cells 112 (only 112(1) to 112(3) shown), motor controllers 120(1) to 120(6), and other subsystems in this embodiment.

Vehicle state (pitch, bank, airspeed, vertical speed and altitude) are commanded a) by an operator using either: a1) physical motions and commands made using the mission-control system 208 as an input device, a2) physical motions and commands made using the sidearm controllers, a3) physical motions and commands transmitted across secure digital or tactical datalinks or radio channels from a ground-remote pilot, or a4) pre-planned mission routes selected and pre-programmed using the mission-control system and corresponding mission-planning software (not shown) in support of autonomous mode; or b) in a UAV mode using pre-planned mission routes selected and pre-programmed using the mission-control system and mission-planning software and uploaded to the onboard autopilot system prior to launch. The mission-control tablet computer 208 may transmit the designated route or position command set to autopilot computers 108(1) to 108(3) and the voter 108V over a serial, radio-control, or similar datalink, and if so, the autopilot may then utilize that designated route or position command set (e.g., a set of altitudes and positions to form a route that is to be traveled from origin to destination).

Depending on the equipment and protocols involved in the example embodiment, a sequence of commands may be sent using a CAN message format from the multi-redundant flight-control computer system 108 to each client device. In this example, command data is contained within CAN-formatted messages, which comply with one of the CAN standards, such as CANopen, among others. Motor speed (e.g., in revolutions per minute (RPM)) for each of the motors 116M(1) to 116M(6) is determined by the command that is sent to the corresponding motor controller 120(1) to 120(6). Motor commands are transmitted digitally from the autopilot computers 108 to the motor controllers 120(1) to 120(6) and status, and/or feedback may be returned from the motor controllers to the autopilot computers using a digital databus CAN, one of many available digital data buses capable of being applied. A modem (modulator—demodulator) or tactical digital datalink may be implicitly present within a datalink device pair when the vehicle is controlled from a ground pilot so that as the user sends CAN commands, the modem or tactical digital datalink transforms such data into a format suitable for reliable transmission and reception across one or more tactical or radio channels, and the mating modem transforms that format back into the original CAN commands at the receiving node, for use within the avionics and the multi-redundant flight-control computer system 108. As understood by a person of ordinary skill in the art, many possible embodiments are available to implement wireless data links between a tablet or ground pilot station and the PAV 100, just as many possible embodiments are available to transmit and receive data and commands among the multi-redundant flight-control computer system 108, the motor controllers 120(1) to 120(6), and the fuel cells 112(1) to 112(4) and support devices that form the onboard power generation and motor controlling system.

A receiver at each autopilot computer 108(1) to 108(3) then uses software algorithms to translate the received commands from the tablet computer or alternate control means (in this example the set of commands representing the control inputs such as pitch, bank and yaw and RPM) into the necessary CAN messages to control each of the multiple (in this example six) motor controllers 120(1) to 120(6), and, correspondingly the motors and prop assemblies 116(1) to 116(6) to achieve the commanded vehicle motions. Commands in this example are messaged using CAN and are converted to and from the hybrid fiber-optic data channels 224 and 228 to accomplish EME immunity and enhanced safety and reliability. The multi-redundant flight-control computer system 108 is also responsible for measuring other vehicle state information, such as pitch angle, bank angle, yaw angle, and accelerations and for maintaining vehicle stability using its own internal sensors and available data.

The command interface between the multi-redundant flight-control computer system 108 and the multiple motor controllers 120(1) to 120(6) will vary from one equipment set to another, and in this embodiment utilize CAN messages to communicate flight control computer data commands or other interface standard apparent to one skilled in the art. Control algorithms operating within the multi-redundant flight-control computer system 108 perform the necessary state analysis and comparisons and generate resultant commands to the individual motor controllers 120(1) to 120(6) and monitor the resulting vehicle state and stability via the hybrid wire-to-fiber data channels 224 and 228. The voter 108V decides which two of three flight-control computers 108(1) to 108(3) are in agreement and automatically performs the voting operation to connect the flight-control computer outputs to the corresponding motor controllers 120(1) to 120(6). For a redundant system, triple-redundancy is the most common means of voting among inputs to detect a possible failure, but other levels of redundancy are also possible, and will be apparent to one skilled in the art.

In a particular control embodiment, the commanded vehicle motion and engine or motor RPM commands could also be embodied by a pair of joysticks and a throttle, similar to those used to control fly-by-wire aircraft, or by a pair of traditional sidearm controllers including a throttle, where the joysticks/sidearm controllers provide readings (which could be potentiometers, hall-effect sensors, or rotary-variable differential transformers (RVDT)) indicative of commanded motions, which may then be translated into the appropriate message format and transmitted to the multi-redundant flight-control computer system 108 by network commands or signals, and thereby used to control the multiple motor controllers 120(1) to 120(6), motor and prop assemblies 116(1) to 116(6). The sidearm controller 208 or joystick can also be embodied in a "steering wheel" or control yoke capable of left-right and fore-aft motion, wherein the 2-axis joystick or control yoke provides two independent sets of single- or dual-redundant variable voltage or potentiometer settings indicative of pitch command (nose up or nose down) and bank command (left side up or left side down). Alternatively, instead of pitch and roll motions, the autopilot may also be capable of generating "go left", "go right", "go forward", "go backward", "yaw left" and/or "yaw right" commands, all while the autopilot is simultaneously maintaining the vehicle in a stable, level or approximately level state. This latter control means offers greater comfort for the passenger(s) since it is more similar to ground-based vehicle motions (such as an automobile) than an air vehicle such as a winged aircraft.

The motors 116M(1) to 116M(6) of the multiple motors and prop assemblies 116(1) to 116(6) in a desirable embodiment are brushless synchronous three-phase AC or DC motors, capable of operating as an aircraft motor and that are either air-cooled or liquid cooled (water or oil are common), or both.

Throughout all of the system operation, controlling and operating the PAV 100 is performed with the necessary safety, reliability, performance and redundancy measures required to protect human life to accepted regulatory or flight-worthiness standards.

Electrical energy to operate the PAV 100 may be derived from fuel cells 112(1) to 112(4), which provide voltage and current to the motor controllers 120(1) to 120(6) through optional high-current diodes or field effect transistors (FETs) 220 (see also FIG. 2) and circuit breakers. As noted above, alternatives include one or more engine-generator sets and/ or batteries, among others. As an example, high current contactors or similar devices are engaged and disengaged under control of a vehicle key switch, similar to a car's ignition switch, that applies voltage to the starter/generator to start the fuel cells 112(1) to 112(4) (alternatively engine-generators) and produce electrical power, although other means of startup will be apparent to one skilled in the art. For example, the high current contactors may be essentially large vacuum relays that are controlled by the vehicle key switch and enable the current to flow to the starter/generator. In accordance with an example embodiment of the present invention, the starter/generator also supplies power to the avionic systems of the PAV 100.

Once stable power is available, the motor controllers 120(1) to 120(6) each individually manage the necessary voltage and current to achieve the desired thrust by controlling the motors 116M(1) to 116M(6), in either RPM mode or torque mode, to enable thrust to be produced by each of the motor and prop assemblies 116(1) to 116(6). The number of motor controllers 120 and motor/prop assemblies 116 per vehicle may be as few as four, and as many as sixteen or more, depending upon vehicle architecture, desired payload (weight), fuel capacity, electric motor size, weight, and power, and vehicle structure, among other variables. For fixed wing aircraft, the number of motor controllers and motors could be as low as one. Advantageously, implementing a multirotor vehicle, such as the PAV 100, having a plurality of independent motor controllers 120 and motors 116M allows the use of smaller motors with lower current demands, such that fuel cells (e.g., the fuel cells 112(1) to 112(4) can produce the necessary voltage and current at a total weight for a functional aviation vehicle while achieving adequate flight durations, and allows the failure of one or more motors or motor controllers to be compensated for by the autopilot to allow continued safe flight and landing in the event of said failure.

In this example, the fuel cells 112(1) to 112(4) are fed by onboard fuel storage 212. The ability to refuel the fuel storage 212 at the origin, at the destination, or at roadside refueling stations is fundamental to the utility and acceptance by the commuting public of the PAV 100. Advantageously, the ability to refuel the fuel storage 212 to replace the energy source for the motors 116M(1) to 116M(6) reduces the downtime required by conventional all-electric vehicles (e.g., battery-operated vehicles) that must be recharged from an external electricity source, which may be a time-consuming process. Variations are included that will operate from compressed natural gas (CNG), liquified petroleum gas (LPG), AvGas (typical aviation fuel), and/or hydrogen (for the fuel-cell versions). Accordingly, the fuel cells 112(1) to 112(4) (or alternatively engine-generator set(s)) can create electricity from fuel to provide power to the motors on the multirotor aircraft, here, the motors 116M(1) to 116M(6) of the PAV 100. Advantageously, the use of fuel cells 112(1) to 112(4) (or alternatively engine-generator set(s)) is more weight efficient than batteries and store a greater energy density than existing Li-ion batteries, thereby reducing the work required by the motors to produce lift. Additionally, the use of hydrogen or liquid hydrogen fuel cells, LPG, CNG, or AvGas reduces the amount of work required by the motors due to the reduced weight as the fuel is consumed.

Due to the nature of an all-electric multirotor vehicle, it is also possible to carry an onboard high-voltage battery and recharging subsystem in place of engine and generator sets or fuel cells with an external receptacle to facilitate recharging the onboard batteries. In some instances, it may also be desirable to operate the vehicle at the end of an electrical and data tether, for long-duration unmanned airborne surveillance, security or other applications. In this situation, power would be replenished or provided via the tether cable, and control information could be provided either by onboard systems as described herein, or by bidirectional wired or broadband or wireless or RF networks operated by ground controllers.

Power to operate the vehicle's avionics and support lighting is provided, for example, by either a) a low-voltage starter-generator powered by the fuel cells 112(1) to 112(4) and providing power to avionics battery, or b) one or more DC to DC converters providing energy to these systems and/or an avionics battery. If a DC to DC converter is used, it can draw power from the high voltage produced by the engine and generator sets or batteries or fuel cells 112 and down-convert the higher voltage, typically 300V DC to as much as 1,000 VDC in this embodiment, to either 12V, 24V, or 28V or other voltage standards, any of which are voltages typically used in small aircraft systems. Navigation, strobe, and landing lights draw power from the low-voltage starter generator and/or the avionics battery and provide necessary aircraft illumination for safety and operations at night under U.S. and foreign airspace regulations. A suitable circuit breaker and switch means are provided to control these ancillary lighting devices as part of the overall system. These lights are commonly implemented as light emitting diode (LED) lights and may be controlled either directly by one or more switches or by a data-bus-controlled switch in response to a CAN or other digital data-bus command. If a CAN or data-bus command system is employed as shown in FIGS. 4A-4D, then multiple "user experience," or "UX", devices may also be employed to provide enhanced user experience with such things as cabin lighting, seat lighting, window lighting, window messaging, sound cancellation or sound cocoon control, exterior surface lighting, exterior surface messaging or advertising, seat messaging, cabin-wide passenger instruction or in-flight messaging, passenger weight sensing, personal device (e.g. iPhone, tablet, iPad, (or Android or other device equivalents in the market or similar personal digital devices) connectivity and charging, and other integrated features as may be added within the cabin or PAV 100.

Pairs of motors 116M(1) to 116M(6) for the multiple motors and prop assemblies 116(1) to 116(6) are commanded to operate at differing RPM or torque settings (determined by whether the autopilot is controlling the motors in RPM or torque mode) to produce slightly differing amounts of thrust under control of the autopilot computers 108(1) to 108(3), thus imparting a pitch moment, or a bank moment, or a yaw moment, or a change in altitude, or a lateral movement, or a longitudinal movement, or simultaneously any combination of the above to the aircraft, using position feedback from the autopilot's 6-axis built-in or remote inertial sensors to maintain stable flight attitude. Sensor data is read by each autopilot computer 108(1) to 108(3) to assess its physical motion and rate of motion, which is then compared to commanded motion in all three dimensions to assess what new motion commands are required.

Not all aircraft employ the same mix of avionics, instrumentation or controllers, or motors, and some aircraft will include equipment different from this mix or in addition to this mix. Not shown, for example, are radios as may be desirable for communications or other small ancillary avionics customary in general aviation aircraft. Whatever the mix is, though, some set of equipment accepts input commands from an operator, translates those input commands into differing thrust amounts from the pairs of counter-rotating motor and prop assemblies 116(1) to 116(6), and thus produces pitch, bank, yaw, and vertical motion of the PAV 100, or lateral and longitudinal as well as and vertical and yaw motion of the PAV, using differing commands to produce differential thrust from the electric motors 116M(1) to 116M(6) operating the propellers/rotors 116P(1) to 116P(6). When combined with avionics, instrumentation, and display of the PAV's current and intended location, the set of equipment enables the operator, whether inside the PAV 100, on the ground via datalink, or operating autonomously through assignment of a pre-planned route, to easily and safely operate and guide the PAV to its intended destination.

Each autopilot computer 108(1) to 108(3) may be embodied in microprocessor-based circuitry and may include the various interface circuits required to communicate with the PAV's data buses, multichannel servo, or network controllers (inputs), and motor controllers 120(1) to 120(6) (outputs), and to take inertial and attitude measurements to maintain stability. This is further detailed in FIG. 3, discussed above, which details key features of the redundant flight-control computer system 108 and voting in relation to the overall system.

In addition, the autopilot computer 108(1) to 108(3) may also be configured for automatic recording or reporting of aircraft position, aircraft state data, velocity, altitude, pitch angle, bank angle, thrust, location, and other parameters typical of capturing aircraft position and performance, for later analysis or playback. To accomplish these requirements, the autopilot computers 108(1) to 108(3) may contain an embedded air-data computer (ADC) and embedded inertial measurement sensors, although these data could also be derived from small, separate stand-alone units. The autopilot system may be operated as a single, dual, triplex or quad, or other controller, but for reliability and safety purposes, the preferred embodiment uses a triple-redundant autopilot system, wherein the units, here, the autopilot/flight-control computers 108(1) to 108(3), share information, decisions, and intended commands in a cooperative relationship using one or more networks (two are typically preferred, for reliability and availability). In the event of a serious disagreement outside of allowable guard-bands, and assuming three units are present, a 2-out-of-3 vote determines the command to be implemented by the motor controllers 120(1) to 120(6), and the appropriate commands are automatically selected via the voter 108V and transmitted to the motor controllers using the hybrid wire-fiber data channel 224. The operator is not typically notified of the controller disagreement during flight, but the result will be logged so that the units may be scheduled for further diagnostics post-flight.

The mission-control system 208 is typically a single- or dual-redundant implementation, wherein each mission-control computer of the system 208 contains identical hardware and software and a screen button designating that mission-control computer as "Primary" or "Backup". The Primary mission-control computer 36 is used in all cases unless it has failed, whereby either the operator (if present) must select the Backup mission-control computer through a touch icon, or an automatic fail-over will select the Backup mission-control computer when the autopilots detect a failure of the Primary mission-control computer. When operating without a formal pre-programmed route, the mission-control system 208 uses its internal motion sensors to assess the operator's intent and transmits the desired motion commands to the autopilot. When operating without a mission-control system, the autopilot computers 108(1) to 108(3) receive their commands from a connected set of joysticks or sidearm controllers. In a UAV mode or in a manned automatic mode, the mission-planning software of the mission-control system 208 may be used pre-flight to designate a route, destination, and altitude profile for the aircraft to fly, forming the flight plan for that flight. Flight plans, if entered into the Primary mission-control computer, are automatically sent to the corresponding autopilot computers 108(1) to 108(3), and the autopilot computers automatically cross-fill the flight-plan details between themselves and the Backup mission-control computer so that each autopilot computer and the mission-control system 208 carry the same mission commands and intended route. In the event that the Primary mission-control computer fails, the Backup mission-control computer already contains the same flight details, and assumes control of the flight once selected either by operator action or automatic fail-over.

For motor control of the multiple motors and prop assemblies 116(1) to 116(6), there are three phases that connect from each high-current controller to each motor for a synchronous AC or DC brushless motor. Reversing the position of any two of the three phases will cause the motor to run the opposite direction. There is alternately a software setting within each motor controller 120(1) to 120(6) that allows the same effect, but it is preferred to hard-wire it, since the designated motors 116M(1) to 116M(6) running in the opposite direction must also have propellers with a reversed pitch (these are sometimes referred to as left-hand vs right-hand pitch, or puller (normal) vs pusher (reversed) pitch rotors, thereby forming the multiple motor and prop assemblies 116(1) to 116(6). Operating the motors 116M(1) to 116M(6) in counter-rotating pairs cancels out the rotational torque that would otherwise be trying to spin the PAV 100.

In the illustrated embodiment, the operational analyses and control algorithms described herein are performed by the onboard multi-redundant flight-control computer system 108, and flight path and other useful data are presented on the avionics displays 200. Various aspects of the present disclosure can be practiced with a different division of labor; for example, some or all of the position and control instructions can in principle be performed outside the aircraft, in ground-based equipment, by using, for example, a broadband or 802.11 WI-FI® network or RF datalink or tactical datalink between the aircraft and the ground-based equipment, and then communicated to and from the fuel cells 112(1) to 112(4) and motor controllers 120(1) to 120(6) via the hybrid wire-fiber data channels 228 and 224, respectively.

The combination of the avionics display system 200 coupled with the ADS-B or Remote ID transceiver/receiver 204 enables the PAV 100: to receive broadcast data from other nearby aircraft and to thereby allow the PAV to avoid close encounters with other aircraft; to broadcast own-aircraft position data to avoid close encounters with other cooperating aircraft; to receive weather data for display to the pilot and for use by the avionics display system within the multirotor PAV; to allow operation of the multirotor PAV with little or no requirement to interact with or communicate with air traffic controllers; and to perform calculations for flight path optimization based upon own-aircraft state, cooperating aircraft state, and available flight path dynamics under the National Airspace System, and thus achieve optimal or near-optimal flight path from origin to destination.

Figure 5:
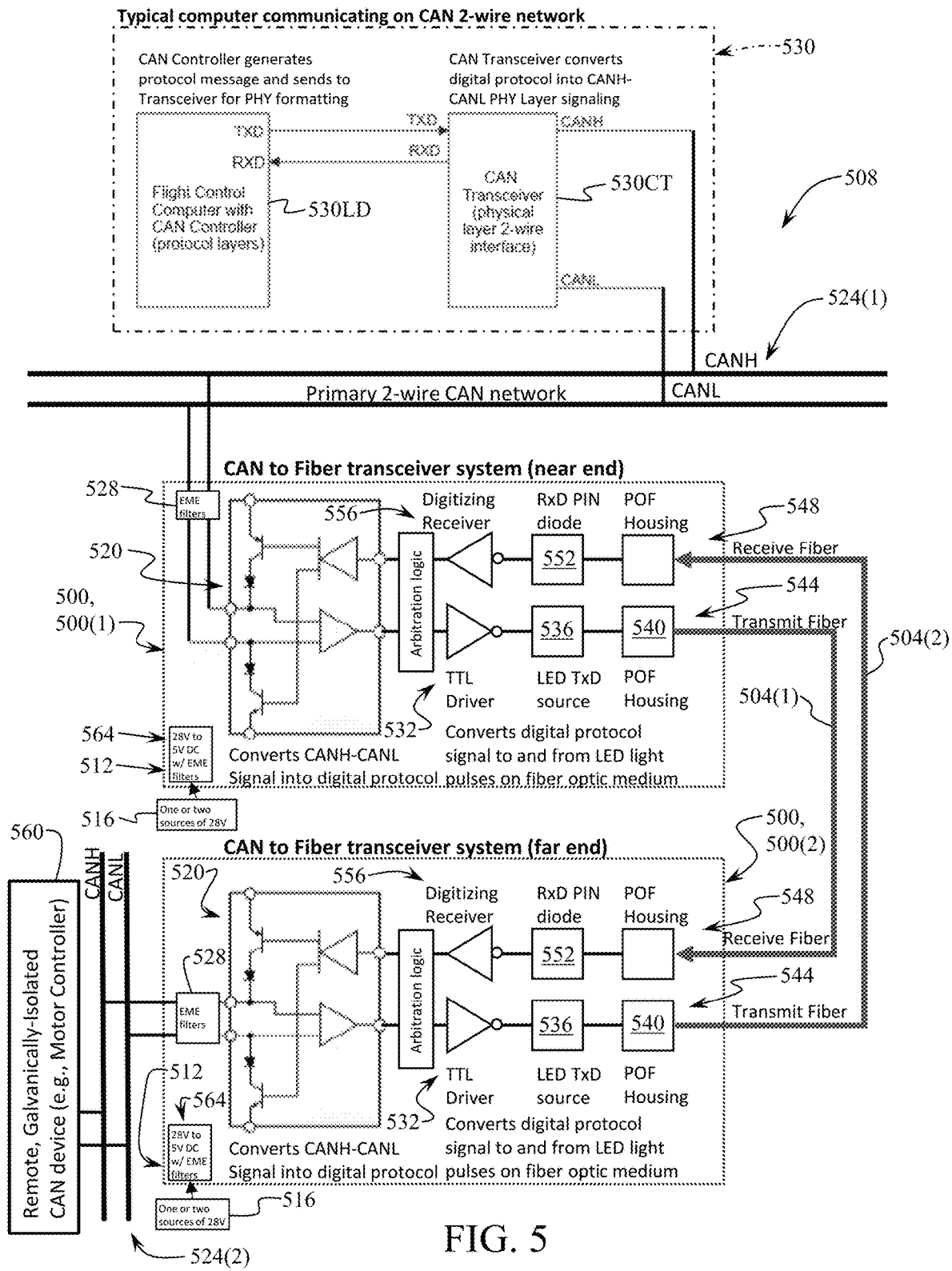
FIG. 5 is a diagram illustrating an example hybrid wire-fiber data network of the present disclosure that may be implemented, for example, in the example air vehicle of FIG. 1.

FIG. 5 depicts an example wire-fiber transceiver 500, here deployed as each of wire-fiber transceiver 500(1) and wire-fiber transceiver 500(2), that can be used, for example, to perform the conversion to and from the CANH/CANL electrical network in the example embodiments of the hybrid wire-fiber data network 104 (FIG. 1) and hybrid wire-fiber data channels 224 and 228 of FIGS. 2-4D. Indeed, each of the near-end and far-end wire-fiber transceivers 224NE, 228NE, 224FE, and 228FE of FIGS. 3-4D may be implemented in the form of the wire-fiber transceiver 500 of FIG. 5 or a variation thereof. As used herein and in any appended claims, the terms "near-end" and "far-end" are relative terms used to indicate the intended direction of the data signal under consideration. In particular, a near-end wire-fiber transceiver is the wire-fiber transceiver in a pair of wire-fiber transceivers that is transmitting the data signal under consideration, and the far-end wire-fiber transceiver is that wire-fiber transceiver in that same pair that receives the just-transmitted data signal under consideration. Thus, a wire-fiber transceiver that both transmits and receives differing data signals under consideration functions as both a near-end wire-fiber transceiver and a far-end transceiver for the two opposing transmit and receive functions.

It is important to note that this particular wire-fiber transceiver 500 has been specifically tailored for low latency and for operation at 1 Mb/sec and above and does not require its own central processing unit (CPU) and/or CAN controller to re-sync the message, as found in conventional CAN-to-fiber bridges or converter units. As long as the delay of the wire-fiber transceiver 500 plus the propagation delay on the fiber, here either of fibers 504(1) and 504(2) depending on the signal direction, remain less than the allotted message time specified by the hybrid wire-fiber data network 508, no intervening controller is required. The example wire-fiber transceiver 500 is also designed to the stringent requirements of the Radio Technical Commission for Aeronautics (RTCA) DO-160G standard to meet or exceed the requirements for isolation voltage, emissions, RF susceptibility, lightning, power surge, voltage variation, shock, vibration, and other requirements for aircraft or other vehicle systems use. This assures that the stand-alone wire-fiber transceiver 500 can be deployed in noisy and/or EMI-prone environments without risk of failure or erroneous behavior. A dedicated set of EME filters 512 (e.g., lightning-surge protection, EMI filter, and HIRV filter) interfaces to and protects the wire-fiber transceiver 500 from lightning, EMI, and HIRF effects that might be imposed from the vehicle's power system 516.

A CAN transceiver 520 within the wire-fiber transceiver 500 interprets the CANH/CANL signaling at the PHY (physical) layer (including wired-side portions 524(1) and 524(2) of a 2-wire CAN network 524) and derives the underlying protocol stream from the CANH/CANL signaling with its own set of EME filters 528 (e.g., lightning-surge protection, EMI filter, and HIRV filter). This ensures that the CAN arbitration and messaging protocols at the PHY layer are respected and carried across the fiber-optic-link segment without need for an intervening CAN-controller chip to re-arbitrate the messages. Other wired transceivers and protocols are of course possible and will be apparent to one skilled in the art. The CAN transceiver 520 in this illustrative case of using a CAN protocol can be implemented, for example, as a model number HI-3000 from Holt Integrated Circuits, Inc., as would be appreciated by one of skill in the art.

In this example, the CANH/CANL signaling is on the wired-side portion 524(1) of the 2-wire CAN network 524 from a CAN-message source 530, here, a combination of a local device 530LD that originates the message and a CAN transceiver 530CT that converts the message into the CANH/CANL PHY layer signaling. Returning back to the near-end wire-fiber transceiver 500(1), the now-digital message stream output by the CAN transceiver 520 of the near-end wire-fiber transceiver is routed through a transmit light-emitting diode (LED) driver 532 through an inverter to a 50 Mb/s LED 536, as one example, which then couples the optical signal, here, via a plastic optic fiber (POF) connector 540 onto the transmit side of the fiber-optic cable 504(1) or 504(2). The fiber-optic transmitter component can be implemented, for example, as a model number AFBR-1624Z from Broadcom Corporation, which has a wavelength of 650 nm and utilizes a 1 mm POF as would be appreciated by one of skill in the art. Other instantiations are of course possible for higher or lower fiber digital switching rates, or at other wavelengths, or with single-mode or multi-mode fiber of varying cable specifications and connector types. While an LED 536 is used in the example, those skilled in the art will readily appreciate that another type of light-emitting element, such as a laser diode, may be used.

An inverter is provided due to the nature of the example CAN PHY layer. Recall that physical layer signaling for CAN in industrial applications differs from signaling for interfaces such as RS485 in that there are only two bus voltage states: a recessive state (driver outputs are high impedance) and dominant state (one bus line, CANH, is high and the other, CANL, is low). Transmitting nodes transmit the dominant state for Logic 0 and the recessive state for Logic 1, which is fundamental to the bus arbitration process. Thus, by adding an inversion stage internally, the dominant state is represented as LED active (light emitted) and the recessive state as LED inactive (no light emitted), since much or most of the transmitter time will be spent in the recessive state. This inversion saves energy and may extend the service life of the LED 536. At the receiving end, here at the far-end wire-fiber transceiver 500(2), an inversion stage is again applied to ensure that the proper signaling levels are returned on the wires of the 2-wire CAN network.

In this embodiment, POFs are employed, but the design is equally applicable to glass optical fiber multimode or single-mode channels, such as 62.5/125 micron multi-mode, or 50/125 micron single-mode fibers or others. Since the underlying protocol rate is 1 Mb/sec, use of a 50 Mb/sec transmitter and receiver minimizes channel delay and ensures that no signals will be corrupted due to a slow rise- and fall-time. Other transceiver/receiver switching rates are possible. In addition, while a pair of fibers 504(1) and 504(2) is shown for each pair of transmitter and receiver at opposing ends of the fiber for one-way transmission, those skilled in the art will readily appreciate that a single fiber can be used for both pairs of transmitters and receivers for bi-directional transmission.

At the far-end wire-fiber transceiver 500(2) in this example, the optical signal from the transmit channel 544 of the near-end wire-fiber transceiver 500(1) is applied to the receive channel 548 of the far-end wire-fiber transceiver 500(2), where it is converted by a PIN diode 552 (or other photodetector) and an amplifier back into electrical levels via a digitizing receiver 556. Other receiver devices may be substituted for the PIN diode depending upon the optical wavelength, energy mode (single or multimode fiber or POF), data rate, and design requirements, among other things. An inverter and the digitizing receiver 556 re-convert the data signal into its original digital message stream format, where it again is applied to the CAN transceiver 520 of the far-end fiber-wire transceiver 500(2) for translation into CANH/CANL PHY signaling for applying to the portion 524(2) of the 2-wire CAN network. If the remote device 560, i.e., the device to receive the CAN message, happened to be contending for the hybrid wire-fiber data network 508 at the same time, the CANH/CANL PHY layer resolves the arbitration and decides who wins, exactly as it would if the remote device were physically connected to a local CAN network. The fiber optic receiver channel 548 can be implemented, for example, using model number AFBR-2624Z from Broadcom Corporation, having a receive wavelength of 650 nm and incorporating a 1 mm POF as would be appreciated by one of skill in the art. Other instantiations are of course possible for higher or lower fiber digital switching rates, or at other wavelengths, or with laser receivers in place of the PIN diodes, or with single-mode or multi-mode fiber of varying cable specifications and connector types.

In this example, the wire-to-fiber transceiver 500 contains its own 28 V isolated DC/DC converter 564 as a power conversion device, allowing it to function as a self-contained stand-alone avionics subsystem without reliance upon the local or remote devices, which may or may not have available a 5 V DC supply at its external signal connectors. This enables the wire-to-fiber transceiver 500 to be applied to any and all devices on a network, in this example a CAN network, wherever isolation or protection is required, while only needing physical connection to the CANH/CANL lines and to a source of 9 V to 36 V DC power. Other voltage source values are of course possible, and will be obvious to one skilled in the art.

As noted above, the wire-to-fiber transceiver 500 also contains its own EME filters 512 for the power input feeds, which are in turn augmented by custom circuitry to provide lightning, EMI, and HIRF protection for the 28V input feeds. It will be apparent to one skilled in the art that other voltages may be substituted for 28V, either within the 9 to 36V range of this embodiment or by substituting other DC/DC converters to a particular need, and that additional filtering may be applied, beyond the present DO160G filtering, as might be required in other applications.

Figure 6:
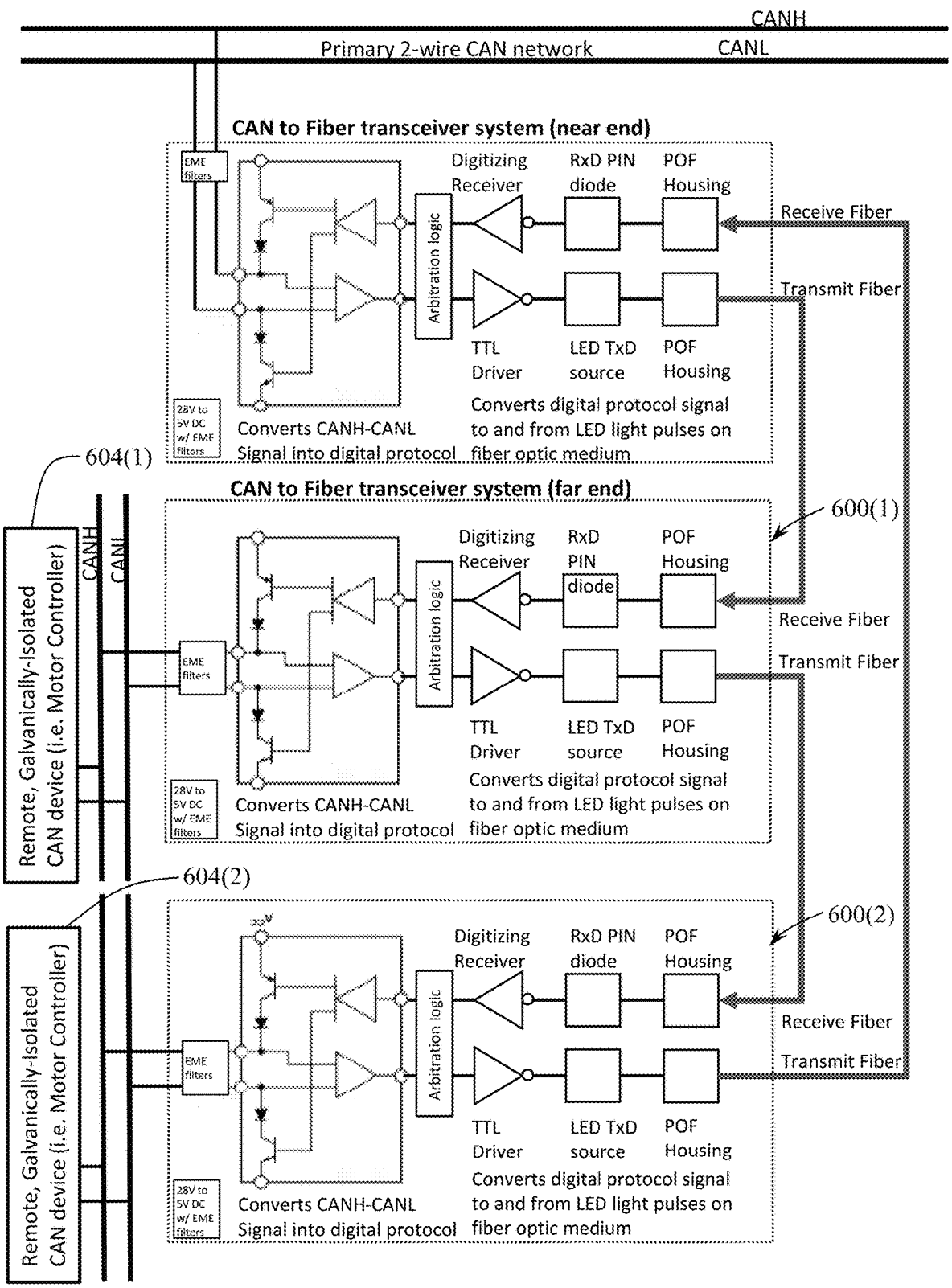
FIG. 6 is a diagram illustrating another example hybrid wire-fiber data network of the present disclosure that may be implemented, for example, in the example air vehicle of FIG. 1.

FIG. 6 is generally similar to FIG. 5 but shows an example daisy-chain implementation 600, wherein more than one far-end wire-fiber transceivers, here, two far-end wire-fiber transceivers 600(1) and 600(2), may be looped on the same fiber-optic circuit in communications with a local device (not shown, but see local device 530LD of FIG. 5). When the local device sends its message, it will be addressed to a specific far-end address such that only one remote device, here, either of remote devices 604(1) and 604(2), will respond to the bus arbitration. When more than one far-end device is connected, only the addressed device will respond to the arbitration protocol. Note that it is important for critical timing to be maintained during bus arbitration, so there will be an upper limit on how many remote devices can be connected in this way. All aspects of FIG. 6 that visually appear the same as or similar to corresponding aspects of FIG. 5 can be assumed to be the same as or similar to such aspects as described relative to FIG. 5.

Figure 7:
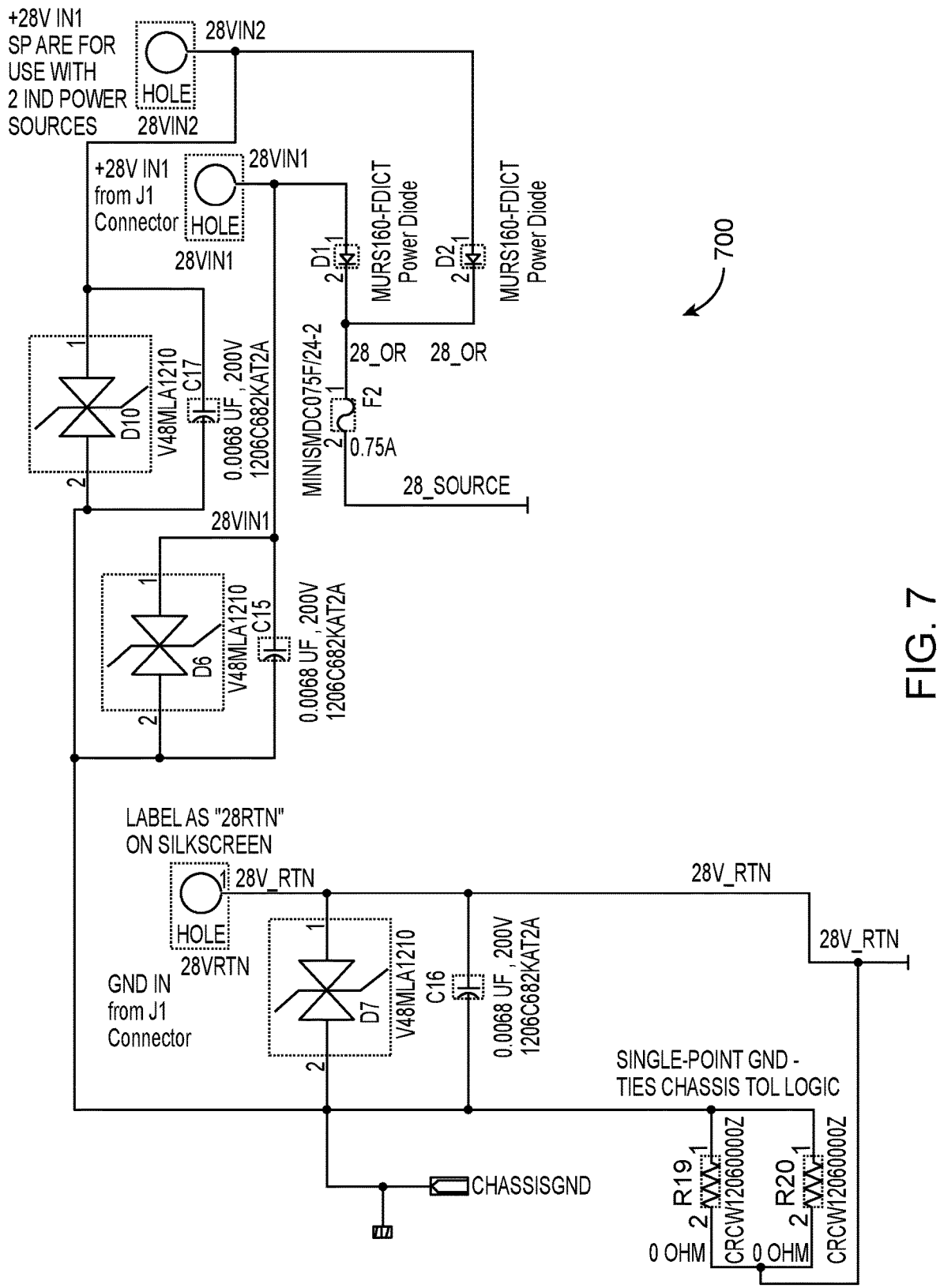
FIG. 7 is a diagram illustrating example voltage-surge-protection circuitry for a power input to a power supplier or power converter of a wire-to-fiber transceiver of the present disclosure, such as any of the wire-to-fiber transceivers of FIGS. 5 and 6.

FIG. 7 shows circuitry 700 that provides an example of how the power inputs of a power supply/converter, such as the DC-DC converter 564 of the wire-fiber transceiver 500 of FIG. 5, may be configured to allow one or two or more power input sources that are internally diode-isolated to be protected for enhanced system reliability. Each power input and its return (typically 0 V) provide a separate path for conducted energy to be dissipated by the bidirectional metal-oxide varistors (MOVs) and conducted to the external case ground. The MOVs, in turn, are designed to suppress a variety of transient events, including suppression of inductive switching and other transient events and suppression of surge voltages such as from lightning, and to provide electrostatic discharge (ESD) protection for internal circuitry. The high-voltage capacitors in turn help to minimize conducted energy from entering the transceiver, and also from being returned to the vehicle source.

Figure 8:
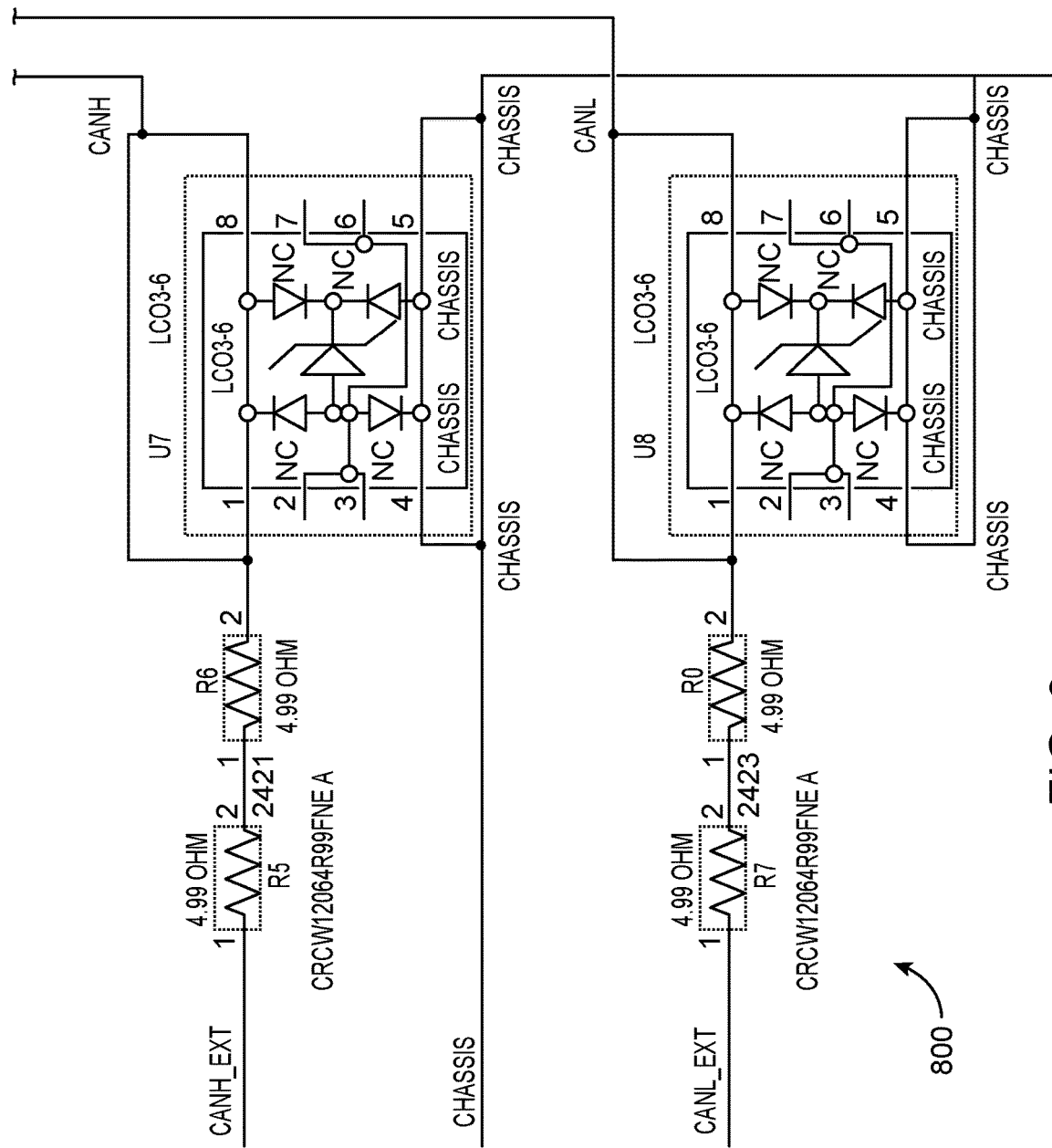
FIG. 8 is a diagram illustrating example circuitry for a wired-network interface of a wire-to-fiber transceiver of the present disclosure, such as any one of the wire-to-fiber transceivers of FIGS. 5 and 6, wherein the example circuitry includes lightning protection circuitry.

FIG. 8 shows an example dedicated lightning protection circuitry 800 in communication with the CAN-network interface and configured to protect the CANH and CANL signals from the effects of coupled high-voltage electromagnetic energy. The example transient voltage suppressor (TVS) shown is designed to protect components which are connected to high-speed low-voltage lines from voltage surges caused by lightning, electrostatic discharge (ESD), and electrical fast transients (EFT). The example device combines a TVS diode with a rectifier bridge to provide transient protection in both common and differential mode with a single device. The capacitance of the device is minimized (<=25 pF) to ensure correct signal transmission on high-speed low-voltage lines.

FIG. 8 also details an example dedicated lightning protection circuit in communication with the CAN network (i.e., wired network) interface and configured to provide additional voltage-withstand protection for the CANH and CANL signals from the effects of lightning energy, wherein the two series resistors each are rated for half of the required withstand voltage for the lightning environment as specified. These two devices withstand the external voltage surge, typically occurring in a very short burst, without exceeding the withstand voltage or power rating of either device or of the TVS. The TVS device is selected with low signal capacitance so as to minimize signal loading on the wire side.

In certain applications, designers may find it advantageous to embed a wire-to-fiber transceiver within or as part of other system elements, for example, a CAN controller and/or various CAN clients such as the fuel cells or the motor controllers. This requires the support from and cooperation of other subsystem suppliers, and, thus, the stand-alone transceiver embodiment may prove to be the most expedient solution. However, one skilled in the art should be able to adapt the teachings of this disclosure to a wide variety of applications and architectures when embedded within the client devices.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A transceiver for a hybrid wire-fiber data network having a wired portion and a fiber-optic portion, wherein the wired portion is designed and configured to implement a media-access protocol having a message-transmission time and that includes a node-arbitration and prioritization scheme, the transceiver comprising:
    a wired-portion interface for connecting the transceiver to the wired portion of the hybrid wire-fiber data network, the wired-portion interface designed and configured to receive electrical-signal inputs from the wired portion of the hybrid wire-fiber network and to output electrical-signal outputs from the transceiver to the wired portion of the hybrid wire-fiber data network;
    at least one electromagnetic environment (EME) filter selected from the group consisting of an electromagnetic interference (EMI) filter and a high-intensity radio frequency (HIRF) filter in electrical communication with the at least one wire connector so as to protect the transceiver from damage due to EMI or HIRF or both;
    at least one fiber-optic-portion interface for connecting the transceiver to the fiber-optic portion of the hybrid wire-fiber data network, the at least one fiber-optic-portion interface designed and configured to output optical-signal outputs from the transceiver to the fiber-optic portion of the hybrid wire-fiber data network and to receive optical-signal inputs from the fiber-optic portion of the hybrid wire-fiber data network;
    electrical-signal to optical-signal conversion circuitry operatively connected between the at least one EME filter and the fiber-optic-portion interface, the electrical-signal to optical-signal conversion circuitry designed and configured to convert the electrical-signal inputs to the optical-signal outputs; and
    optical-signal to electrical signal conversion circuitry operatively connected between the optic-fiber-portion interface and the wired-portion interface, the optical-signal conversion circuitry designed and configured to convert the optical-signal inputs to the electrical-signal outputs;
    wherein the transceiver is configured to have a maximum signal delay that is less than the message transmission time of the media-access protocol so as to comply with requirements of the node-arbitration and prioritization scheme without requiring message reformulation.

2. The transceiver of claim 1, wherein the hybrid wire-fiber data network has a first wired side and a second wired side and the transceiver further comprises arbitration logic configured to determine a signal priority as between the first wired side and the second wired side.

3. The transceiver of claim 2, wherein the media-access protocol has a dominant signal state, and the arbitration logic is configured to determine a first of the first wired side and the second wired side enters the dominant signal state before the other of the first wired side and the second wired side and block the other of the first wired side and the second wired side from asserting the dominant state.

4. The transceiver of claim 3, wherein the arbitration logic is configured to implement a time delay when the first of the first wired side and the second wired side releases the dominant signal state, wherein the time delay determines when to remove the block of the other of the first wired side and the second wired side from asserting the dominant state.

5. The transceiver of claim 4, wherein the time delay is determined by an intended speed of the media-access protocol.

6. The transceiver of claim 5, wherein the media-access protocol is a controller area network (CAN) protocol or a derivative of the CAN protocol.

7. The transceiver of claim 1, further comprising a power supply/converter for powering circuitry onboard the transceiver, the power supply/converter having a power input for receiving electrical power from an external source, wherein the power input includes at least one EME filter selected from the group consisting of an EMI filter and a HIRF filter.

8. The transceiver of claim 7, wherein the power input includes both the EMI filter and the HIRF filter.

9. The transceiver of claim 8, wherein the power input further includes a dedicated lightning protection circuit.

10. The transceiver of claim 1, wherein the at least one EME filter includes both the EMI filter and the HIRF filter.

11. The transceiver of claim 1, wherein the media-access protocol is a bit-wise arbitration protocol, and the transceiver is configured without a means for re-arbitrating.

12. The transceiver of claim 11, wherein the transceiver is further configured so that the hybrid wire-fiber data network does not require any supplemental arbitrator or controller due to the presence of one or more instances of the transceiver in the hybrid wire-fiber data network.

13. The transceiver of claim 1, wherein the media-access protocol includes a controller area network (CAN) protocol utilizing a CANH signal and a CANL signal on the wired portion of the hybrid wire-fiber data network, wherein the CANH and CANL signal can exhibit a dominant state or a recessive state during operation.

14. The transceiver of claim 13, wherein the electrical-signal to optical-signal conversion circuitry inverts the dominant and recessive states represented on the CANH and CANL signals when generating the optical-signal outputs.

15. The transceiver of claim 14, wherein the optical-signal to electrical-signal conversion circuitry inverts Logic 1 and Logic 0 signals carried on the optical-signal inputs in order to represent the dominant and recessive states when generating the CANH and CANL electrical-signal outputs.

16. The transceiver of claim 1, further comprising a dedicated lightning protection circuit in operative communication with wired-portion interface.

17. The transceiver of claim 1, further comprising internal EMI shielding for the electrical-signal to optical-signal conversion circuitry and the optical-signal to electrical-signal conversion circuitry.

18. The transceiver of claim 1, further comprising external EMI shielding for the entirety of the electrical-signal to optical-signal conversion circuitry and the optical-signal to electrical-signal conversion circuitry, to enhance the overall EME immunity of the device.

19. The transceiver of claim 1, further comprising isolated power supply switching circuitry designed and configured to operate to at least an altitude of 5000 meters while maintaining 1600 V of isolation between voltages internal and external to the power supply.

20. A hybrid wire-fiber data network, comprising:
- a first wired subnetwork implementing a media-access protocol that includes a node-arbitration scheme having a bitwise arbitration priority scheme, the first wired subnetwork including at least one first node;
- a second wired subnetwork implementing the media-access protocol, the second wired subnetwork including at least one second node;
- a fiber-optic link between the first and second wired subnetworks, the fiber-optic link having a first end and a second end;
- a first transceiver operatively connecting the first end of the fiber-optic link to the first wired subnetwork, the first transceiver being a transceiver according to claim 1; and
- a second transceiver operatively connecting the second end of the fiber-optic link to the second wired subnetwork, the second transceiver being a transceiver according to claim 1.

21. The hybrid wire-fiber data network of claim 20, wherein the media-access protocol includes a controller area network (CAN) protocol or a derivative of a CAN protocol.

22. The hybrid wire-fiber data network of claim 20, wherein the at least one first node is operatively connected to a motor controller, a fuel-cell controller, or a battery controller, or any combination thereof, and the at least one second node is operatively connected to a system controller or a flight-control computer or other source of control commands.

23. A vehicle, comprising:
- a propulsion system;
- a control system operatively configured to provide control commands to the propulsion system; and
- a hybrid wire-fiber data network according to claim 20 operatively connected between the control system and the propulsion system so as to pass the control commands from the control system to the propulsion.

24. The vehicle of claim 23, wherein the propulsion system comprises at least one of a motor controller, a battery controller, a fuel-cell controller, and a power-generation system.

25. The vehicle of claim 23, wherein the vehicle is an air vehicle.

26. The vehicle of claim 25, wherein the air vehicle is an electric vertical takeoff and landing (eVTOL) air vehicle containing one or more electric motors for providing thrust or lift or both.

27. The vehicle of claim 25, wherein the air vehicle is one of 1) an electric conventional takeoff and landing (eCTOL) air vehicle containing one or more electric motors for providing thrust or lift or both, or 2) an electric fixed-wing or hybrid-wing air vehicle containing one or more electric motors for providing thrust or lift or both.

28. The vehicle of claim 23, wherein the vehicle is an electric truck or tractor or tractor-trailer pair containing one or more electric motors for providing propulsion.

29. The vehicle of claim 23, wherein the vehicle is an electric rail vehicle containing one or more electric motors for propulsion.

30. The vehicle of claim 23, wherein the vehicle is a marine vehicle containing one or more electric motors for providing propulsion.

* * * * *